(12) United States Patent
Li et al.

(10) Patent No.: US 10,925,034 B2
(45) Date of Patent: Feb. 16, 2021

(54) RESOURCE INDICATION METHOD, APPARATUS, AND SYSTEM

(71) Applicant: Huawei Technologies Co., Ltd., Shenzhen (CN)

(72) Inventors: Hua Li, Shanghai (CN); Yi Qin, Kista (SE); Zhongfeng Li, Munich (DE); Yi Ren, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/503,282

(22) Filed: Jul. 3, 2019

(65) Prior Publication Data

US 2019/0327717 A1 Oct. 24, 2019

Related U.S. Application Data

(63) Continuation of application No. PCT/CN2017/110875, filed on Nov. 14, 2017.

(30) Foreign Application Priority Data

Jan. 6, 2017 (CN) .......................... 201710011048.6

(51) Int. Cl.
  *H04W 72/02* (2009.01)
  *H04L 5/00* (2006.01)
  *H04W 72/04* (2009.01)

(52) U.S. Cl.
  CPC .......... *H04W 72/02* (2013.01); *H04L 5/0048* (2013.01); *H04L 5/0094* (2013.01); *H04W 72/042* (2013.01); *H04W 72/044* (2013.01)

(58) Field of Classification Search
  CPC . H04W 72/02; H04W 72/042; H04W 72/044; H04L 5/0048; H04L 5/0094
  See application file for complete search history.

(56) References Cited

U.S. PATENT DOCUMENTS

2015/0180625 A1   6/2015  Park et al.
2019/0373614 A1*  12/2019 Yum ................. H04W 72/0493

FOREIGN PATENT DOCUMENTS

CN    103874207 A    6/2014
CN    103945447 A    7/2014
(Continued)

OTHER PUBLICATIONS

"WF on CSI-RS for beam management," 3GPP TSG RAN WG1 Meeting #87, Reno, USA, R1-1613570, pp. 1-4, 3rd Generation Partnership Project, Valbonne, France (Nov. 14-18, 2016).

(Continued)

*Primary Examiner* — Eric Myers

(74) *Attorney, Agent, or Firm* — Leydig, Voit & Mayer, Ltd.

(57) ABSTRACT

A communication operation carried out by a base station is described herein. The operation includes generating first indication information. The first indication information indicates configuration information of a first resource. The operation further includes generating second indication information. The second indication information indicates a relationship between a second resource and the first resource to a terminal. The operation further includes sending the first indication information and the second indication information, so that the terminal determines its own receiving resource or sending resource. When the base station indicates the receiving resource or the sending resource of the terminal resource indication overheads can be reduced.

12 Claims, 8 Drawing Sheets

(56) References Cited

FOREIGN PATENT DOCUMENTS

| JP | 2014530535 A | 11/2014 |
|---|---|---|
| WO | 2013039355 A3 | 5/2013 |
| WO | 2014166110 A1 | 10/2014 |
| WO | 2016024187 A1 | 2/2016 |
| WO | 2016148127 A1 | 9/2016 |
| WO | 2016182072 A1 | 11/2016 |

OTHER PUBLICATIONS

"WF on CSI-RS for beam management," 3GPP TSG RAN WG1 Meeting #87,Reno, USA, R1-1613669, pp. 1-6, 3rd Generation Partnership Project, Valbonne, France (Nov. 14-18, 2016).
"Views on Quasi Co-Located Antenna Ports," 3GPP TSG-RAN WG1 #87, Reno, Nevada, USA, R1-1612053, 3rd Generation Partnership Project, Valbonne, France (Nov. 14-18, 2016).
"Beamforming for data and control channel," 3GPP TSG RAN WG1 Meeting #87, Reno, USA, R1-1611386, 3rd Generation Partnership Project, Valbonne, France (Nov. 14-18, 2016).
"Beam management for Control Channel," 3GPP TSG RAN WG1 Meeting #87, Reno, USA, R1-1611421,3rd Generation Partnership Project, Valbonne, France (Nov. 14-18, 2016).
"Beam management for DL control channel," 3GPP TSG RAN WG1 #87, Reno, USA, R1-1612516, 3rd Generation Partnership Project, Valbonne, France (Nov. 14-18, 2016).

\* cited by examiner

RESOURCE INDICATION METHOD, APPARATUS, AND SYSTEM

CROSS-REFERENCE TO RELATED APPLICATIONS

This Application is a continuation of International Application No. PCT/CN2017/110875, filed on Nov. 14, 2017, which claims priority of Chinese Patent Application No. 201710011048.6, filed on Jan. 6, 2017. The disclosures of the aforementioned applications are hereby incorporated by reference in their entireties.

TECHNICAL FIELD

The present application relates to the field of mobile communications networks, and in particular, to a resource indication method, an apparatus, and a system.

BACKGROUND 5G evolution needs to support high-data-rate communication. High-band spectrum resources have relatively large bandwidths, and can effectively implement the high-data-rate communication. However, due to a radio propagation characteristic of a high band, high-band path attenuation is high, and as a result, high-band coverage is limited, and how to maintain good coverage while supporting a high data rate is a key issue.

A high-band wavelength is relatively short. In this case, an antenna spacing may be reduced, and more antenna array elements can be placed for a same area. A large quantity of antenna array elements can form large-scale array antennas, and the large-scale array antennas can bring an array gain by using beamforming (BF), thereby effectively increasing coverage and reducing high-band path attenuation. Therefore, in the high band, a base station usually communicates with a terminal by using a beam, as shown in FIG. 1.

For a large-scale antenna array, not every antenna array element can separately connect to one radio-frequency channel in consideration of costs. In a circumstance with limited radio-frequency channels, analog phase weighting can be implemented at a radio-frequency end by using a phase shifter at the radio-frequency end, and an analog beam is formed at the radio-frequency end. The analog beam may be formed at the base station, or may be formed at the terminal. Different beam directions can be obtained by changing a phase weight of the antenna array element. For the high band, an analog beam may be used or an analog-digital hybrid weighting scheme may be used, in consideration of a coverage requirement.

In a beam-based communication mode, communication of both a channel and a signal may be performed by using a beam. Communication of a control channel and a data channel may be performed by using a same beam or different beams based on a requirement. When the base station selects a downlink transmitting beam for communication, a link gain can be maximized only when the terminal selects a corresponding downlink receiving beam. Therefore, when scheduling a downlink channel, the base station needs to instruct the terminal to use a specific downlink receiving beam for receiving. Likewise, the base station also needs to instruct the terminal to use a specific uplink transmitting beam to send a physical uplink control channel (PUCCH) and a physical uplink shared channel (PUSCH). To do so, a resource needs to be indicated. Therefore, how to implement a low-overhead signaling indication is a problem that needs to be resolved.

SUMMARY

To resolve the foregoing technical problem, exemplary embodiments of the present invention provide a resource indication method, a system, and a device. The technical solutions are as follows:

According to a first aspect, an embodiment of the present invention provides a communication method, including:

generating, by a base station, first indication information, where the first indication information is used to indicate configuration information of a first resource; generating, by the base station, second indication information, where the second indication information is used to indicate a relationship between a second resource and the first resource; and sending, by the base station, the first indication information and the second indication information to a terminal, so that the terminal determines its own receiving resource or sending resource based on the first indication information and the second indication information.

In a possible design, the first indication information includes a type of the first resource and/or a length of the first resource.

In a possible design, the type of the first resource is used to indicate a relationship between a sending resource of the base station and a time unit or a relationship between the sending resource of the terminal and a time unit.

In a possible design, a length of the type of the first resource is 2 bits.

In a possible design, a first type of the first resource indicates that sending resources are the same across different sub-time units in a same time unit, and sending resources are different across different time units.

In a possible design, a second type of the first resource indicates that sending resources are different across different sub-time units in a same time unit, and sending resources are the same across different time units.

In a possible design, a third type of the first resource indicates a combination of the first type and the second type.

In a possible design, the length of the first resource includes a quantity of time units.

In a possible design, the quantity of time units is greater than or equal to 1.

In a possible design, the second indication information includes one or more types of the following information: a time unit identifier, a sub-time unit identifier, and a reference signal received power RSRP sequence number.

In a possible design, the second indication information further includes one or more types of the following information:

a channel state information reference signal resource indicator CSI-RS resource indicator, a sounding reference signal resource indicator SRS resource indicator, a channel state information CSI measurement setting, and a sounding reference signal SRS measurement setting.

In a possible design, the second indication information further includes quasi co-location QCL indication information.

In a possible design, the QCL indication information includes one or more types of the following information:

a delay spread, a Doppler spread, a Doppler shift, an average gain, an average delay, an angle of arrival AOA, an angle of departure AOD, an average AOA, an average AOD, a transmitting beam, a receiving beam, a receive antenna spatial relation parameter, and a resource identifier.

In a possible design, the first indication information and the second indication information are sent to the terminal device by being encapsulated in any one or more of the following messages: a physical downlink control channel PDCCH message, or a radio resource control RRC message, or a media access control control element MAC CE.

In a possible design, the receiving resource is a receiving beam or a receive port, and the sending resource is a transmitting beam or a transmit port.

When the base station indicates the receiving resource or the sending resource of the terminal, according to the technical solutions provided in the embodiments of the present invention, resource indication overheads can be reduced.

According to a second aspect, a communication method is further provided, including: receiving first indication information and second indication information from a base station, where the first indication information is used to indicate configuration information of a first resource, and the second indication information is used to indicate a relationship between a second resource and the first resource; and determining its own receiving resource or sending resource based on the first indication information and the second indication information.

In a possible design, the first indication information includes a type of the first resource and/or a length of the first resource.

In a possible design, the type of the first resource is used to indicate a relationship between a sending resource of the base station and a time unit or a relationship between the sending resource of the terminal and a time unit.

In a possible design, a first type of the first resource indicates that sending resources are the same across different sub-time units in a same time unit, and sending resources are different across different time units.

In a possible design, a second type of the first resource indicates that sending resources are different across different sub-time units in a same time unit, and sending resources are the same across different time units.

In a possible design, a third type of the first resource indicates a combination of the first type and the second type.

In a possible design, the length of the first resource includes a quantity of time units.

In a possible design, the second indication information includes one or more types of the following information: a time unit identifier, a sub-time unit identifier, and a reference signal received power RSRP sequence number.

In a possible design, the second indication information further includes one or more types of the following information:

a channel state information reference signal resource indicator CSI-RS resource indicator, a sounding reference signal resource indicator SRS resource indicator, a channel state information CSI measurement setting, and a sounding reference signal SRS measurement setting.

In a possible design, the second indication information further includes QCL indication information.

In a possible design, the QCL indication information is one or more types of the following information: a delay spread, a Doppler spread, a Doppler shift, an average gain, an average delay, an angle of arrival AOA, an angle of departure AOD, an average AOA, an average AOD, a transmitting beam, a receiving beam, a receive antenna spatial relation parameter, and a resource identifier.

In a possible design, the receiving resource includes a receiving beam or a receive port, and the sending resource includes a transmitting beam or a transmit port.

When the base station indicates the receiving resource or the sending resource of the terminal, according to the technical solution provided in the embodiments of the present invention, resource indication overheads can be reduced.

According to a third aspect, a base station includes: a processor, configured to: generate first indication information, where the first indication information is used to indicate configuration information of a first resource; and generate, by the base station, second indication information, where the second indication information is used to indicate a relationship between a second resource and the first resource; and a transceiver, configured to send the first indication information and the second indication information to a terminal, so that the terminal determines its own receiving resource or sending resource based on the first indication information and the second indication information.

In a possible design, the first indication information includes a type of the first resource and/or a length of the first resource.

In a possible design, the type of the first resource is used to indicate a relationship between a sending resource of the base station and a time unit or a relationship between the sending resource of the terminal and a time unit.

In a possible design, a length of the type of the first resource is 2 bits.

In a possible design, a first type of the first resource indicates that sending resources are the same across different sub-time units in a same time unit, and sending resources are different across different time units.

In a possible design, a second type of the first resource indicates that sending resources are different across different sub-time units in a same time unit, and sending resources are the same across different time units.

In a possible design, a third type of the first resource indicates a combination of the first type and the second type.

In a possible design, the length of the first resource includes a quantity of time units.

In a possible design, the second indication information includes one or more types of the following information: a time unit identifier, a sub-time unit identifier, and a reference signal received power RSRP sequence number.

In a possible design, the second indication information further includes one or more types of the following information:

a channel state information reference signal resource indicator CSI-RS resource indicator, a sounding reference signal resource indicator SRS resource indicator, a channel state information CSI measurement setting, and a sounding reference signal SRS measurement setting.

In a possible design, the second indication information further includes quasi co-location QCL indication information.

In a possible design, the QCL indication information includes one or more types of the following information:

a delay spread, a Doppler spread, a Doppler shift, an average gain, an average delay, an angle of arrival AOA, an angle of departure AOD, an average AOA, an average AOD, a transmitting beam, a receiving beam, a receive antenna spatial relation parameter, and a resource identifier, where the resource identifier may be a channel state information reference signal resource indicator CSI-RS resource indicator, or a sounding reference signal resource indicator SRS resource indicator.

In a possible design, the first indication information and the second indication information are sent to the terminal device by being encapsulated in any one or more of the following messages: a physical downlink control channel PDCCH message, or a radio resource control RRC message, or a media access control control element MAC CE.

In a possible design, the receiving resource is a receiving beam or a receive port, and the sending resource is a transmitting beam or a transmit port.

When the base station indicates the receiving resource or the sending resource of the terminal, according to the technical solution provided in the embodiments of the present invention, resource indication overheads can be reduced.

According to a fourth aspect, a terminal includes: a transceiver, configured to receive first indication information and second indication information from a base station, where the first indication information is used to indicate configuration information of a first resource; and the second indication information is used to indicate a relationship between a second resource and the first resource; and a processor, configured to determine its own receiving resource or sending resource based on the first indication information and the second indication information.

In a possible design, the first indication information includes a type of the first resource and/or a length of the first resource.

In a possible design, the type of the first resource is used to indicate a relationship between a sending resource of the base station and a time unit or a relationship between the sending resource of the terminal and a time unit.

In a possible design, a first type of the first resource indicates that sending resources are the same across different sub-time units in a same time unit, and sending resources are different across different time units.

In a possible design, a second type of the first resource indicates that sending resources are different across different sub-time units in a same time unit, and sending resources are the same across different time units.

In a possible design, a third type of the first resource indicates a combination of the first type and the second type.

In a possible design, the length of the first resource includes a quantity of time units.

In a possible design, the second indication information includes one or more types of the following information: a time unit identifier, a sub-time unit identifier, and a reference signal received power RSRP sequence number.

In a possible design, the second indication information further includes one or more types of the following information: a channel state information reference signal resource indicator CSI-RS resource indicator, a sounding reference signal resource indicator SRS resource indicator, a channel state information CSI measurement setting, and a sounding reference signal SRS measurement setting.

In a possible design, the second indication information further includes QCL indication information.

In a possible design, the QCL indication information is one or more types of the following information: a delay spread, a Doppler spread, a Doppler shift, an average gain, an average delay, an angle of arrival AOA, an angle of departure AOD, an average AOA, an average AOD, a transmitting beam, a receiving beam, a receive antenna spatial relation parameter, and a resource identifier, where the resource identifier may be a channel state information reference signal resource indicator CSI-RS resource indicator, or a sounding reference signal resource indicator SRS resource indicator.

In a possible design, the receiving resource includes a receiving beam or a receive port, and the sending resource includes a transmitting beam or a transmit port.

When the base station indicates the receiving resource or the sending resource of the terminal, according to the technical solution provided in the embodiments of the present invention, resource indication overheads can be reduced.

Another aspect of this application provides a computer readable storage medium. The computer readable storage medium stores an instruction. When the instruction is run on a computer, the computer executes the method in the foregoing aspects.

Still another aspect of this application provides a computer program product that includes an instruction. When the instruction is run on a computer, the computer executes the method in the foregoing aspects.

When the base station indicates the receiving resource or the sending resource of the terminal, according to the technical solution provided in the embodiments of the present invention, resource indication overheads can be reduced.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may derive other drawings from these accompanying drawings without creative efforts.

DESCRIPTION OF EMBODIMENTS

Figure 1:
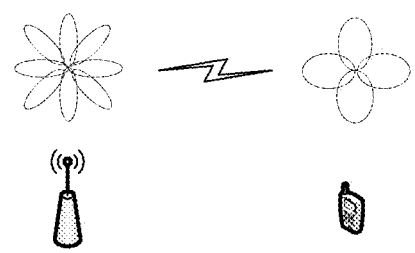
FIG. 1 is a schematic diagram of communication between a base station and a terminal by using a beam.

To make the invention objectives, features, and advantages of the present invention clearer and more comprehensible, the following clearly describes the technical solutions in the embodiments of the present invention with reference to the accompanying drawings in the embodiments of the present invention. Apparently, the embodiments described in the following are merely some rather than all of the embodiments of the present invention. All other embodiments obtained by a person skilled in the art based on the embodiments of the present invention shall fall within the protection scope of the present invention.

In the specification, claims, and accompanying drawings of the present application, the terms "first", "second", and so on are intended to distinguish between similar objects but do not necessarily indicate a specific order or sequence. It should be understood that the terms used in such a way are interchangeable in proper circumstances, which is merely a discrimination manner that is used when objects having a same attribute are described in the embodiments of the present invention. In addition, the terms "include", "contain" and any other variants mean to cover non-exclusive inclusion, so that a process, method, system, product, or device that includes a series of units is not necessarily limited to those units, but may include other units not expressly listed or inherent to such a process, method, system, product, or device.

The technical solutions of the embodiments of the present invention may be applied to various communications systems, such as: a global system for mobile communications (GSM), a code division multiple access (CDMA) system, a wideband code division multiple access (WCDMA) system, a general packet radio service (GPRS) system, a long term evolution (LTE) system, an LTE frequency division duplex (FDD) system, an LTE time division duplex (TDD) system, a universal mobile telecommunications system (UMTS), a worldwide interoperability for microwave access (WiMAX) communications system, a future 5G system, or the like.

A terminal in illustrative embodiments of the present invention may communicate with one or more core networks by using a radio access network (RAN). The user equipment may be referred to as an access terminal, a subscriber unit, a subscriber station, a mobile station, a mobile console, a remote station, a remote terminal, a mobile device, a user terminal, a terminal, a wireless communications device, a user agent, or a user apparatus. The access terminal may be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, an in-vehicle device, a wearable device, and a terminal in a future 5G network.

A base station in illustrative embodiments of the present invention may be a network-side device configured to communicate with the terminal. For example, the base station may be a base transceiver station (BTS) in a GSM system or a CDMA system, may be a NodeB (NB) in a WCDMA system, or may be an evolved NodeB (eNB or eNodeB) in an LTE system. Alternatively, the network device may be a relay station, an access point, an in-vehicle device, a wearable device, a gNB in a future 5G network, a network-side device in a future evolved PLMN network, or the like.

Figure 2:
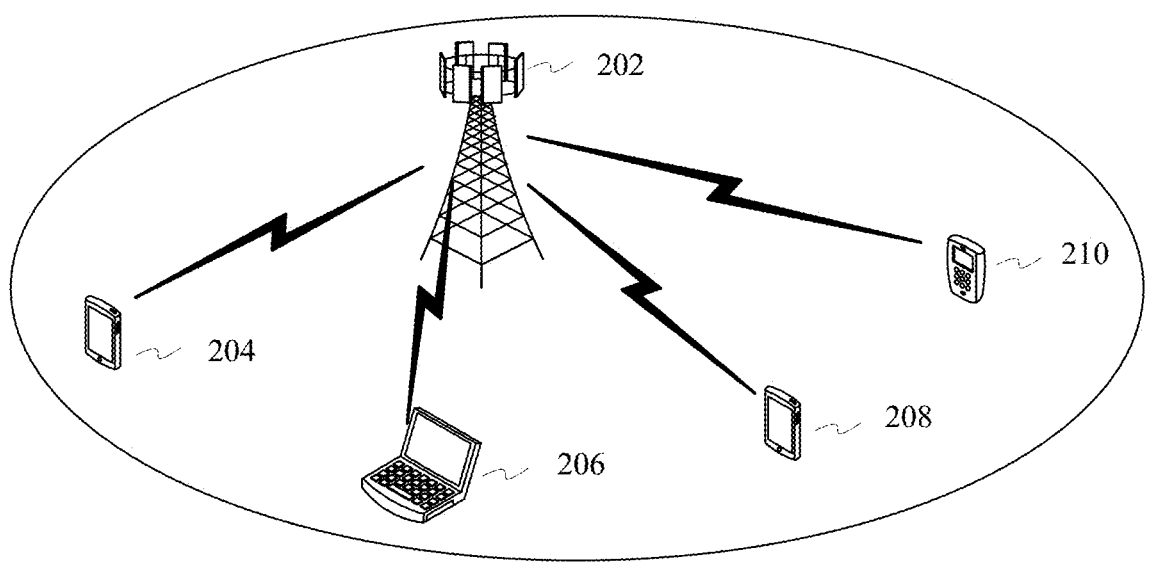
FIG. 2 is a schematic architectural diagram of a base station and a terminal according to an embodiment of the present invention.

FIG. 2 is a schematic architectural diagram of a communications network 200 according to an embodiment of the present invention. A network device 202 manages uplink and downlink communication of terminals 204 to 210 within its coverage area (e.g., a mobile phone and a notebook computer are used as terminals in FIG. 2, and the terminals in FIG. 2 may also be other terminal devices described above). The network device 202 may alternatively be referred to as a cellular tower, an eNodeB, a gNB, a transmission reception point (TRP), an access network, a base station BS, or the like. The network device 202 may simultaneously support transmission of a plurality of beams.

It should be understood that a downlink direction described in the embodiments of the present invention is a direction from a base station to a terminal device, and an uplink direction is a direction from a terminal device to a base station. A receiving resource described in the embodiments of the present invention may be a receiving beam or a receive port, and a sending resource may be a transmitting beam or a transmit port.

It should further be understood that in 5G communications, the base station and the terminal device need to undergo a process of beam measurement (which may also be referred to as beam sweeping) before transmitting data. In a downlink, when the base station instructs the terminal to use one or more specific downlink receiving resources, the base station only needs to indicate to the terminal that a currently-used downlink sending resource and a downlink sending resource used in a previous measurement are QCL in terms of a parameter. After receiving the indication, the terminal may receive the downlink sending resource from the base station by using a downlink receiving resource corresponding to the downlink sending resource used in the previous beam measurement. In an uplink, when the base station instructs the terminal to use one or more specific uplink sending resources, the base station also only needs to indicate to the terminal that a currently-used uplink sending resource and an uplink sending resource used in a previous measurement are QCL in terms of a parameter. After receiving the indication, the terminal may use an uplink sending resource corresponding to an uplink receiving resource used in the previous beam measurement.

For beam management, a related conclusion reached at the RAN1 #87 meeting held in October 2016 includes three mechanisms for downlink beam management (a standard for uplink beam management has not been determined).

First procedure (Procedure 1, P1 for short): The terminal device measures different downlink transmitting beams from the base station by using different downlink receiving beams, to determine a downlink transmitting beam of the base station and a downlink receiving beam on a terminal side.

Second procedure (Procedure 2, P2 for short): The terminal device measures different downlink transmitting beams from the base station by using a same downlink receiving beam, to determine a downlink transmitting beam of the base station.

Third procedure (Procedure 3, P3 for short): The terminal device measures a same downlink transmitting beam from the base station by using different downlink receiving beams, to determine a downlink receiving beam on a terminal side.

It should be understood that although discussions on beams are only performed at the RAN1 currently, and no discussion on a transmit port or a receive port has been performed, both a sending resource and a receiving resource in the embodiments of the present invention include a beam or a port.

At the recently concluded 3GPP RAN1 #87 meeting, in discussions on downlink beam management (beam management) (uplink beam management has not been discussed), quasi co-location (QCL) is supported and used to instruct the terminal to determine a receiving resource of a downlink control channel. In general, a person skilled in the art should understand that a QCL relationship between two ports means that reference signals corresponding to the two antenna ports have a same or similar parameter, or that the QCL relationship means that the terminal device may determine, based on a parameter of one antenna port, a parameter of the other antenna port that has the QCL relationship with the antenna port, or that the QCL relationship means that the two antenna ports have a same or similar parameter, or that the QCL relationship means that a parameter difference between the two antenna ports is less than a predetermined threshold. The parameter may be at least one of a delay spread, a Doppler spread, a Doppler shift, an average gain, an average delay, an angle of arrival (AOA), an angle of departure (AOD), an average angle of arrival (average AOA), an average angle of departure (average AOD), a transmitting beam(s), a receiving beam(s), a receive antenna spatial relation (Spatial relation) parameter, and a resource identifier. The beam includes at least one of the following: a pre-code, a weight sequence number, and a beam sequence number. The angle may be decomposition values of different dimensions, or a combination of decomposition values of different dimensions. The antenna ports are antenna ports with different antenna port numbers, and/or antenna ports that have a same antenna port number and that are used for sending or receiving information at different periods of time and/or frequencies and/or code domain resources, and/or antenna ports that have different antenna port numbers and that are used for sending or receiving information at different periods of time and/or frequencies and/or code domain resources. The resource identifier includes a channel state information reference signal (CSI-RS) resource identifier or a sounding reference signal (SRS) resource identifier, and is used to indicate a beam on a resource.

Figure 3:
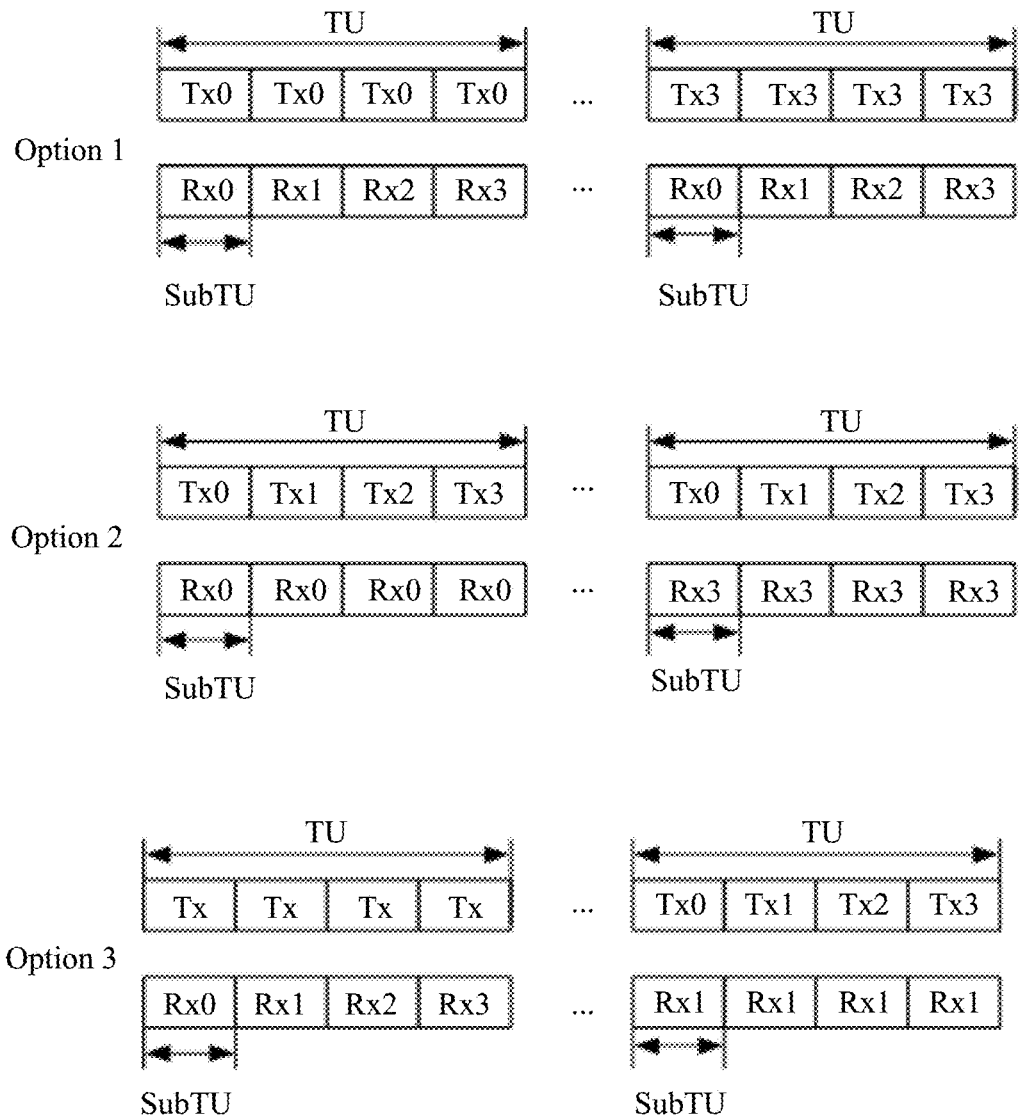
FIG. 3 is a schematic interaction diagram of a communication manner according to a method embodiment of the present invention.

At the RAN1 #87 meeting held in November 2016, a time unit (TU) and a sub-time unit (STU) were defined, where each time unit includes one or more sub-time units. Each time unit may include one or more OFDM symbols. A current standard agrees on further study of three options, to identify a relationship between a sending resource and a time unit, and the three options are respectively referred to as options 1, 2, and 3, as shown in FIG. 3:

Option 1 (option 1): Transmitting beams are the same across different STUs in a same TU; and transmitting beams are different across different TUs (Tx beam(s) are same across sub-time units within each time unit, Tx beam(s) are different across time units).

Option 2 (option 2): Transmitting beams are different across different STUs in a same TU; and transmitting beams are the same across different TUs (Tx beam(s) are different across sub-time units within each time unit, Tx beam(s) are same across time units).

Option 3 (option 3): This option is a combination of the option 1 and the option 2. Transmitting beams are the same in all STUs in a same TU; and transmitting beams are different across different sub-time units in different TUs.

It should be understood that, in a configuration of the option 1, when the configuration information indicates a receiving resource of the terminal, transmitting beams sent by the base station to the terminal device in different sub-time units in each time unit are the same, and transmitting beams sent by the base station to the terminal device in each of different time units are different. Four transmitting beams are used as an example in FIG. 3.

It should be understood that, in a configuration of the option 2, when the configuration information indicates a receiving resource of the terminal, transmitting beams sent by the base station in different sub-time units in each time unit to the terminal device are different, and transmitting beams sent by the base station to the terminal device in each of different time units are the same. Four transmitting beams are used as an example in FIG. 3.

In this patent application, a TU of the option 1 is defined as a TU 1, a TU of the option 2 is defined as a TU 2, and a TU of the option 3 is defined as a TU 3. Therefore, the TU 3 is actually a combination of the TU 1 and the TU 2.

A core idea of the embodiments of the present invention is as follows: For a downlink, a base station sends configuration information to a terminal device, where the configuration information carries some indication information, and the terminal device determines its own downlink receiving resource based on the indication information. For an uplink, a base station sends configuration information, where the configuration information carries indication information, and a terminal determines its own uplink sending resource based on the indication information. The downlink solution and the uplink solution are separately described below by using different embodiments.

Figure 4:
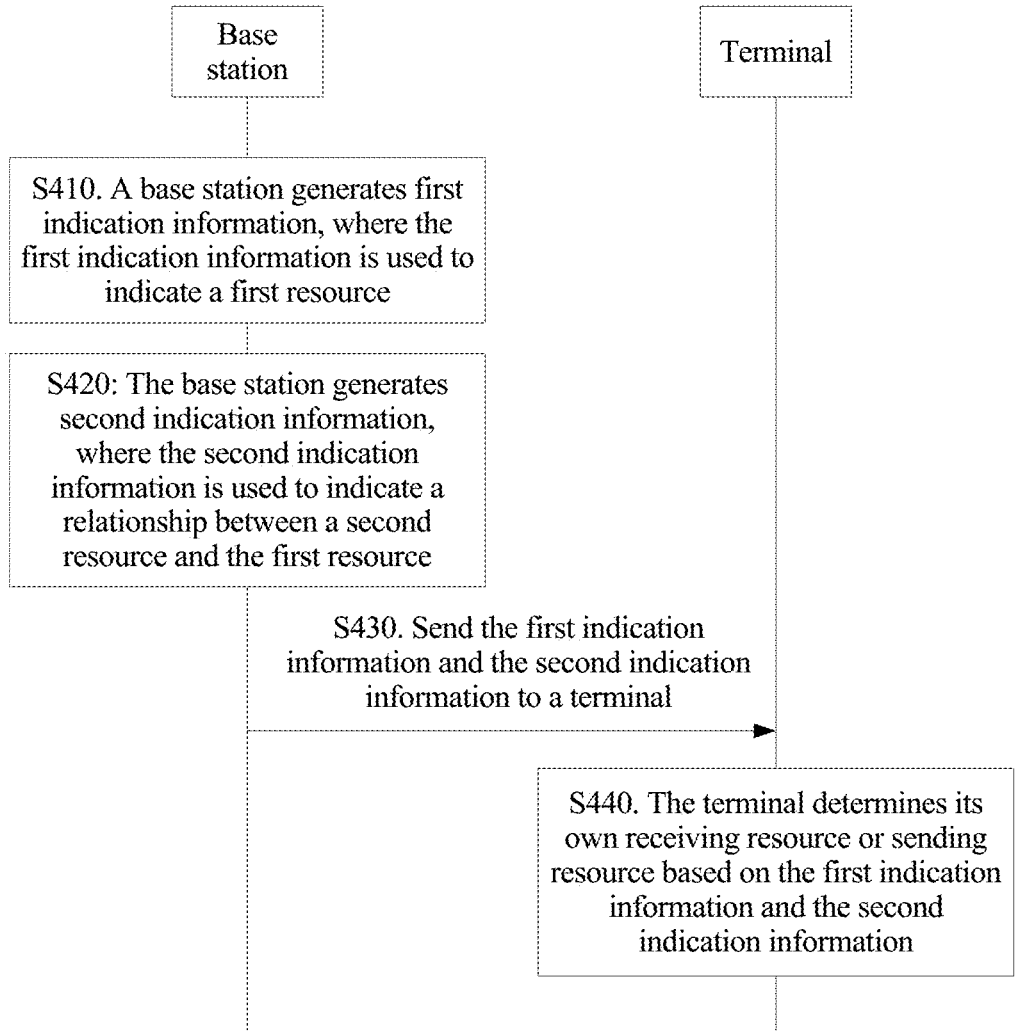
FIG. 4 is an interaction diagram of a communication method according to an embodiment of the present invention.

An embodiment of the present invention provides a resource indication method 400. As shown in FIG. 4, the method includes the following steps.

Step 410: A base station determines first indication information, where the first indication information is used to indicate configuration information of a first resource.

Step 420: The base station determines second indication information, where the second indication information is used to indicate a relationship between a second resource and the first resource.

Step 430: The base station sends the first indication information and the second indication information to a terminal.

Step 440: The terminal determines its own receiving resource based on the first indication information and the second indication information.

The configuration information of the first resource may include a type of the first resource and/or a length of the first resource.

Optionally, the type of the first resource is used to indicate a relationship between a sending resource of the base station and a time unit (for a downlink) or a relationship between the sending resource of the terminal and a time unit (for an uplink). The length of the first resource is used to indicate a quantity of time units. For the time unit, refer to a definition of the TU in a conclusion reached at the RAN1 #87 meeting.

To be specific, one time unit includes time-frequency resources of one or more OFDM symbols.

Specifically, the type of the first resource in this embodiment of the present invention may be a TU 1, a TU 2, or a TU 3, or may be an option 1, an option 2, or an option 3. The length of the first resource may be a quantity of TUs. For example, the resource type includes two bits. When a value of one bit is 01, the bit is used to identify that a measurement resource type is the TU 1; when the value is 10, the bit is used to identify that the measurement resource type is the TU 2; and when the value is 11, the bit is used to identify that the measurement resource type is the TU 3.

For example, a first type of the first resource indicates that sending resources are the same across different sub-time units in a same time unit, and sending resources are different across different time units. A second type of the first resource indicates that sending resources are different across different sub-time units in a same time unit, and sending resources are different across different time units. A third type of the first resource indicates a combination of the first type and the second type. Sending resources are the same across all sub-time units in a same time unit, and sending resources are different across different sub-time units in different time units.

It should be understood that the quantity of time units varies with a band or application scenario, and ranges from several to hundreds or even thousands. Each time unit includes a plurality of sub-time units, and one sub-time unit may be corresponding to one sending resource.

The second indication information may include one or more types of the following information: a time unit identifier, a sub-time unit identifier, and a reference signal received power (RSRP) sequence number.

Optionally, the second indication information may further include one or more types of the following information: a channel state information reference signal resource indicator (CSI-RS resource indicator), a sounding reference signal resource indicator (SRS resource indicator), a channel state information CSI measurement setting, and a sounding reference signal SRS measurement setting. This embodiment of the present invention is further described below by using several examples.

Downlink Solution: Embodiment 1

Figure 5:
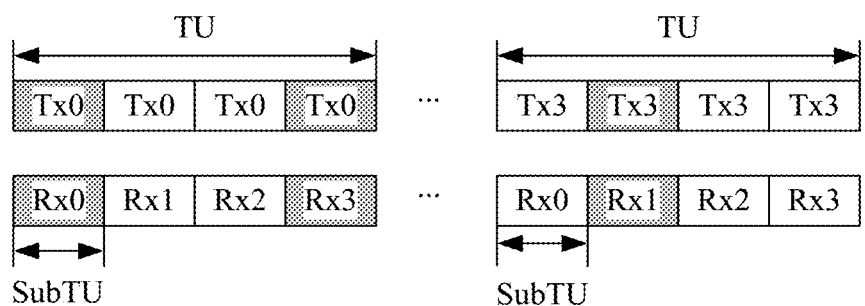
FIG. 5 is a schematic diagram of one type of configuration information according to an embodiment of the present invention.

Example 1: As shown in FIG. 5, the base station configures the first indication information, where the first indication information includes the type of the first resource and/or a length of the TU, the type of the first resource in FIG. 5 is the TU 1, the length of the TU is N, and N is an integer greater than 1.

Optionally, the first indication information may further include indication information indicating a quantity of STUs included in each TU.

The base station configures the second indication information, where the second indication information includes the TU identifier, and the TU identifier is location information of a TU relative to a length of all TUs configured in the first indication information. For example, if there are a total of four TUs in FIG. 5, the four TUs may be identified by using 2 bits. For example, the first TU is 00, the second TU is 01, the third TU is 10, and the fourth TU is 11.

Optionally, the second indication information may further include a quantity of STUs or identification information of an STU.

Optionally, the second indication information may further include QCL indication information. For example, the information may be carried by default by defining a field occupied by the indication information as a QCL indication field, and is used to identify that a sending resource currently used by the base station and a sending resource used for a TU identifier in a measurement resource configured in the first indication information are QCL in terms of a parameter. For example, the parameter is an angle of arrival (AOA). This indicates that AOAs at which two sending resources arrive at the terminal are the same, or indicates that the terminal may use a same downlink receiving resource for the two sending resources. Similarly, examples of other parameters are not listed one by one herein, which should be understood by a person skilled in the art.

In addition, as shown in FIG. 5, one TU further includes a plurality of STUs, which indicates that one sending resource is corresponding to a plurality of receiving resources, and the terminal needs to determine its own one or more receiving resources from the plurality of receiving resources. For example, a possible implementation is as follows: The base station and the terminal predefine in advance that the terminal receives a downlink transmitting beam from the base station by using one or more beams with a largest RSRP in a beam measurement process by default, so that the terminal may select, based on its own previous measurement result, one or more receiving beams with a largest RSRP in a plurality of receiving resources, to receive the downlink transmitting beam from the base station.

Example 2: As shown in FIG. 5, the base station configures the first indication information, where the first indication information includes the type of the first resource and/or a length of the TU, the type of the first resource in FIG. 5 is the TU 1, the length of the TU is N, and N is an integer greater than 1.

Optionally, the first indication information may further include indication information indicating a quantity of STUs included in each TU.

The base station configures the second indication information, and the second indication information includes the RSRP sequence number. A reporting mode in which the terminal performs reporting at one time after measurement of all TUs is completed is used as an example. The base station indicates one or more sequence numbers to the terminal based on an RSRP reporting sequence of the terminal by using a previous reporting result of the terminal. The terminal may determine its own receiving beam with reference to previous reported content of the terminal. For example, the terminal previously reports an RSRP0, an RSRP1, an RSRP2, and an RSRP3, and identifies the RSRPs by using 2 bits. For example, 00 is used to identify the RSRP0, 01 is used to identify the RSRP1, 10 is used to identify the RSRP2, and 11 is used to identify the RSRP3. When the second indication information of the base station indicates 11, 11 is used to identify a receiving beam with the RSRP3. Therefore, the terminal may also determine its own receiving resource based on an RSRP sequence number indicated by the base station.

Optionally, the second indication information may further include QCL indication information. For example, a field occupied by the indication information may be defined as a QCL indication field, to identify that a current sending resource of the base station and a sending resource corresponding to the RSRP sequence number are QCL in terms of a parameter. For example, the parameter is an AOA on the terminal side. This indicates that AOAs at which two sending resources arrive at the terminal side are the same. In other words, the terminal may receive a downlink transmitting beam of the base station by using a same receiving beam as that used in previous measurement. Similarly, examples of other parameters are not listed one by one herein, which should be understood by a person skilled in the art.

Example 3: As shown in FIG. 5, the base station configures the first indication information, where the first indication information includes the type of the first resource and/or a length of the TU, the type of the first resource in FIG. 5 is the TU 1, the length of the TU is N, and N is an integer greater than 1.

Optionally, the first indication information may further include indication information indicating a quantity of STUs included in each TU.

The base station configures the second indication information, where the second indication information includes the STU identifier, and the STU identifier is location information of an STU in one TU. For example, one TU in FIG. 5 has a total of four STUs. The four STUs may be identified by using 2 bits, where the first STU is 00, the second STU is 01, the third STU is 10, and the fourth STU is 11.

Optionally, the second indication information may further include QCL indication information. For example, a field occupied by the indication information may be defined as a QCL indication field, to identify that a sending resource used by the base station in current sweeping and a sending resource used for an STU identifier in a sweeping resource configured in the first indication information are QCL in terms of a parameter. For example, the parameter is an AOA on the terminal side. This indicates that AOAs at which two sending resources arrive at the terminal side are the same. In other words, the terminal may receive a downlink transmitting beam of the base station by using a same receiving beam as that used in previous measurement. Similarly, examples of other parameters are not listed one by one herein, which should be understood by a person skilled in the art.

The terminal traverses all STUs in each TU. Therefore, only an STU identifier needs to be indicated, and the terminal can determine to use which receiving resource.

A person skilled in the art should understand that, in Examples 1 to 3, that the second indication information is separately the TU identifier, the STU identifier, and the RSRP sequence number is used as an example for description. When the second indication information includes the TU identifier and the STU identifier, or the TU identifier and the RSRP sequence number, or the STU identifier and the RSRP sequence number, the terminal may also determine a receiving resource, and details are not described herein again.

Example 4: As shown in FIG. 5, the base station configures the first indication information, where the first indication information includes the type of the first resource and/or a length of the TU, the type of the first resource in FIG. 5 is the TU 1, the length of the TU is N, and N is an integer greater than 1.

Optionally, the first indication information may further include indication information indicating a quantity of STUs included in each TU.

The base station configures the second indication information, where the second indication information includes the TU identifier and the RSRP sequence number, which is specific to a reporting mode in which the terminal reports a measurement result in a TU each time measurement of the TU is completed. The TU identifier is location information of a TU relative to a length of all TUs configured in the first indication information. For example, if there are a total of four TUs in FIG. 5, a corresponding TU may be identified by using 2 bits, where the first TU is 00, the second TU is 01, the third TU is 10, and the fourth TU is 11.

The RSRP sequence number indicates that the base station indicates one or more sequence numbers to the terminal based on a reporting sequence of the terminal by using a previous reporting result of the terminal. The terminal may determine its own receiving beam with reference to previous reported content of the terminal. For example, the terminal previously reports an RSRP0, an RSRP1, an RSRP2, and an RSRP3, and identifies the RSRPs by using 2 bits. For example, 00 is used to identify the RSRP0, 01 is used to identify the RSRP1, 10 is used to identify the RSRP2, and 11 is used to identify the RSRP3. When the base station indicates 11, 11 is corresponding to a receiving beam with the RSRP3.

It should be understood that Examples 4 and 5 do not include QCL indication information, and the terminal may determine its own receiving resource based on the first indication information and the second indication information.

Example 5: As shown in FIG. 5, the base station configures the first indication information, where the first indication information includes the type of the first resource and/or a length of the TU, the type of the first resource in an example in FIG. 5 is the TU 1, the length of the TU is N, and N is an integer greater than 1.

Optionally, the first indication information may further include indication information indicating a quantity of STUs included in each TU.

The base station configures the second indication information, where the second indication information includes the RSRP sequence number, which is specific to a reporting mode in which the terminal performs reporting at one time after measurement of all TUs is completed. The base station indicates one or more sequence numbers to the terminal based on a reporting sequence of the terminal by using a previous reporting result of the terminal. The terminal may determine its own receiving beam with reference to previous reported content of the terminal. For example, the terminal previously reports an RSRP0, an RSRP1, an RSRP2, and an RSRP3, and identifies the RSRPs by using 2 bits. For example, 00 is used to identify the RSRP0, 01 is used to identify the RSRP1, 10 is used to identify the RSRP2, and 11 is used to identify the RSRP3. When the base station indicates 11, 11 is corresponding to a receiving beam with the RSRP3. In such a manner, an indication is performed with reference to the reported content of the terminal, and if not all measurement results are reported by the terminal, overheads are reduced compared to a full indication manner.

For any one of Examples 1 to 5, further, if there are a plurality of antenna panels on the terminal side, that is, the terminal supports a plurality of receiving beams at the same time, the second indication information may further include CSI-RS resource indicator information used for distinguishing between a plurality of receiving beams in a same STU.

For any one of Examples 1 to 5, further, if the terminal has a plurality of pieces of CSI-RS measurement setting information, the terminal further needs to determine a result for a specific piece of measurement setting information. In this case, the second indication information may further include CSI-RS measurement setting information used for distinguishing between different CSI-RS measurement settings.

Similarly, for any one of Examples 1 to 5, the second indication information may further include a sounding reference signal resource indicator SRS resource indicator used for distinguishing between different SRS resources.

Similarly, for any one of Examples 1 to 5, the second indication information may further include a sounding reference signal SRS measurement setting used for distinguishing between different SRS measurement settings.

Figure 6:
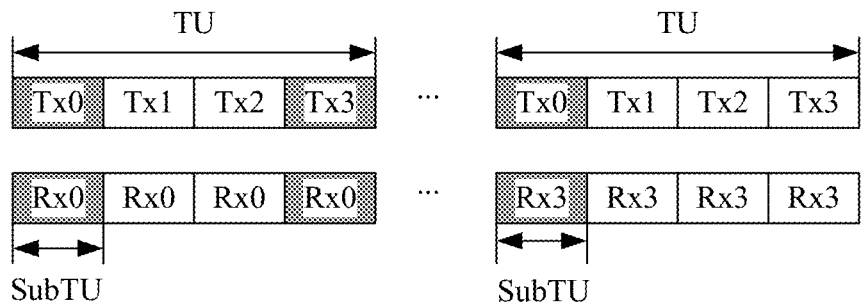
FIG. 6 is a schematic diagram of another type of configuration information according to an embodiment of the present invention.

Example 6: In FIG. 6, the base station configures the first indication information, where the first indication information includes the type of the first resource and/or a length of the TU, the type of the first resource in FIG. 6 is the TU 2, the length of the TU is N, and N is greater than 1; in addition, the first indication information may further include information indicating that one TU includes four STUs.

Optionally, the first indication information may further include indication information indicating a quantity of STUs included in each TU.

The base station configures the second indication information, where the second indication information includes the TU identifier, and the TU identifier is location information of a TU relative to a length of all TUs configured in the first indication information. For example, if there are a total of four TUs in FIG. 6, a corresponding TU may be identified by using 2 bits, where the first TU is 00, the second TU is 01, the third TU is 10, and the fourth TU is 11.

Optionally, the second indication information further includes QCL indication information. For example, a field occupied by the indication information may be defined as a QCL indication field, to identify that a sending resource currently used by the base station and a sending resource used for a TU identifier in a measurement resource configured in the first indication information are QCL in terms of a parameter. For example, the parameter is an AOA on the terminal side. This indicates that AOAs at which two sending resources arrive at the terminal side are the same. In other words, the terminal may receive a transmitting beam of the base station by using a same receiving beam as that used in previous measurement. Similarly, examples of other parameters are not listed one by one herein, which should be understood by a person skilled in the art.

It can be seen from FIG. 6 that, STUs corresponding to one TU use a same receiving beam. Therefore, the terminal only needs a TU identifier to determine a receiving beam.

Example 7: In FIG. 6, the base station configures the first indication information, where the first indication information includes the type of the first resource and/or a length of the TU, the type of the first resource in FIG. 6 is the TU 2, the length of the TU is N, and N is greater than 1.

Optionally, the first indication information may further include indication information indicating a quantity of STUs included in each TU.

The base station configures the second indication information, where the second indication information includes the RSRP sequence number, which is specific to a reporting mode in which the terminal performs reporting at one time after measurement of all TUs is completed. The base station indicates one or more sequence numbers to the terminal based on an RSRP reporting sequence of the terminal by using a previous reporting result of the terminal. The terminal may determine its own receiving beam with reference to previous reported content of the terminal. For example, the terminal previously reports an RSRP0, an RSRP1, an RSRP2, and an RSRP3, and identifies the RSRPs by using 2 bits. For example, 00 is used to identify the RSRP0, 01 is used to identify the RSRP1, 10 is used to identify the RSRP2, and 11 is used to identify the RSRP3. When the second indication information of the base station indicates 11, 11 is corresponding to a receiving beam with the RSRP3. Therefore, the terminal can determine its own receiving beam based on the RSRP sequence number.

Optionally, the second indication information may further include QCL indication information. For example, a field occupied by the indication information may be defined as a QCL indication field, to identify that a current sending resource of the base station and a sending resource corresponding to the RSRP sequence number are QCL in terms of a parameter. For example, the parameter is an AOA on the terminal side. This indicates that AOAs at which two sending resources arrive at the terminal side are the same. In other words, the terminal may receive a transmitting beam of the base station by using a same receiving beam as that used in previous measurement. Similarly, examples of other parameters are not listed one by one herein, which should be understood by a person skilled in the art.

Example 8: In FIG. 6, the base station configures the first indication information, where the first indication information includes the type of the first resource and/or a length of the TU, the type of the first resource in FIG. 6 is the TU 2, the length of the TU is N, and N is greater than 1.

Optionally, the first indication information may further include indication information indicating a quantity of STUs included in each TU.

The base station configures the second indication information, where the second indication information includes the STU identifier, and the STU identifier is location information of an STU in one TU. For example, there are a total of four STUs in one TU in FIG. 5, and a corresponding STU may be identified by using 2 bits, where the first STU is 00, the second STU is 01, the third STU is 10, and the fourth STU is 11. Because each TU corresponds to different STUs in FIG. 6, a specific TU to which an STU belongs cannot be determined based on only an STU identifier. In this case, it may be agreed on that one or more beams with a largest RSRP are used in a corresponding STU in all TUs. Therefore, only an STU identifier needs to be indicated, and the terminal can correspondingly know which one or more receiving beams should be used.

Optionally, the second indication information may further include QCL information. For example, the information may be carried by default by defining a field occupied by the indication information as a QCL indication field. In this case, it indicates that a used sending resource and a sending resource used for an STU identifier in a sweeping resource configured in the first indication information are QCL in terms of a parameter. For example, the parameter is an AOA on the terminal side. This indicates that AOAs at which two sending resources arrive at the terminal side are the same. In other words, a same receiving beam may be used for two beams. Similarly, examples of other parameters are not listed one by one herein, which should be understood by a person skilled in the art.

Example 9: In FIG. 6, the base station configures the first indication information, where the first indication information includes the type of the first resource and/or a length of the TU, the type of the first resource in FIG. 6 is the TU 2, the length of the TU is N, and N is greater than 1.

Optionally, the first indication information may further include indication information indicating a quantity of STUs included in each TU.

The base station configures the second indication information, where the second indication information includes the TU identifier, which is specific to a reporting mode in which the terminal reports a measurement result in a TU each time measurement of the TU is completed. The TU identifier is location information of a TU relative to a length of all TUs configured in the first indication information. For example, if there are a total of four TUs in FIG. 5, a corresponding TU may be identified by using 2 bits, where the first TU is 00, the second TU is 01, the third TU is 10, and the fourth TU is 11.

Example 10: In FIG. 6, the base station configures the first indication information, where the first indication information includes the type of the first resource and/or a length of the TU, the type of the first resource in FIG. 6 is the TU 2, the length of the TU is N, and N is greater than 1.

Optionally, the first indication information may further include indication information indicating a quantity of STUs included in each TU.

The base station configures the second indication information, where the second indication information includes the RSRP sequence number, which is specific to a reporting mode in which the terminal performs reporting at one time after measurement of all TUs is completed. The base station indicates one or more sequence numbers to the terminal based on a reporting sequence of the terminal by using a previous reporting result of the terminal. The terminal may determine its own receiving beam with reference to previous reported content of the terminal. For example, the terminal previously reports an RSRP0, an RSRP1, an RSRP2, and an RSRP3, and identifies the RSRPs by using 2 bits. For example, 00 is used to identify the RSRP0, 01 is used to identify the RSRP1, 10 is used to identify the RSRP2, and 11 is used to identify the RSRP3. When the base station indicates 11 by using the second indication information, 11 is corresponding to a receiving beam with the RSRP3. Therefore, the terminal can determine its own receiving resource based on the RSRP sequence number.

It should be understood that the second indication information in Examples 9 and 10 does not carry QCL indication information, and the terminal may also determine its own receiving resource based on the first indication information and the second indication information.

For any one of Examples 6 to 10, further, if there are a plurality of antenna panels on the terminal side, that is, the terminal supports a plurality of receiving beams at the same time, the second indication information may further include CSI-RS resource indicator information used for distinguishing between a plurality of receiving beams in a same STU.

For any one of Examples 6 to 10, further, if the terminal has a plurality of pieces of CSI-RS measurement setting information, the terminal further needs to determine a result for a specific piece of measurement setting information. In this case, the second indication information may further include CSI-RS measurement setting information used for distinguishing between different CSI-RS measurement settings.

Similarly, for any one of Examples 6 to 10, the second indication information may further include a sounding reference signal resource indicator SRS resource indicator used for distinguishing between different SRS resources.

Similarly, for any one of Examples 6 to 10, the second indication information may further include a sounding reference signal SRS measurement setting used for distinguishing between different SRS measurement settings.

Figure 7:
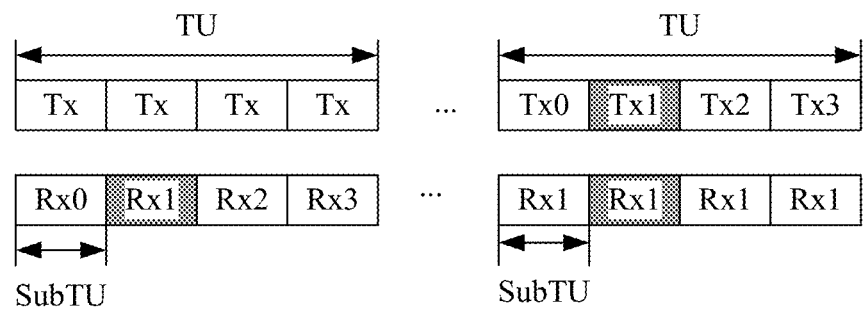
FIG. 7 is a schematic diagram of another type of configuration information according to an embodiment of the present invention.

Example 11: In FIG. 7, the base station first uses a wide beam for sending and the terminal uses a narrow beam for receiving in a polling mode. Then, the terminal determines one or more narrow beams, and when the narrow beam remains unchanged, allows the base station to perform polling by using the narrow beam. The base station configures the first indication information, where the first indication information includes the type of the first resource and/or a length of the TU. The type of the first resource in FIG. 7 includes both the TU 1 and the TU 2.

(1) If a length of the TU 1 is 1 and a length of the TU 2 is 1, a receiving beam of the terminal does not need to be indicated.

(2) If a length of the TU 1 is 1, a length of the TU 2 is N, and N is greater than 1, this case is similar to Example 10, and the foregoing indication manner may be used.

Optionally, the first indication information may further include indication information indicating a quantity of STUs included in each TU.

The base station configures the second indication information, where the second indication information includes the TU identifier, and the TU identifier is location information of a TU relative to a length of all TUs configured in the first indication information. For example, if there are a total of four TUs in FIG. 6, the four TUs may be identified by using 2 bits, where the first TU is 00, the second TU is 01, the third TU is 10, and the fourth TU is 11.

Optionally, the second indication information may further include QCL indication information. For example, the information may be carried by default by defining a field occupied by the indication information as a QCL indication field. In this case, it indicates that a used sending resource and a sending resource used for a TU identifier in a sweeping resource configured in the first indication information are QCL in terms of a parameter. For example, the parameter is an AOA on the terminal side. This indicates that AOAs at which two sending resources arrive at the terminal side are the same. In other words, the terminal may receive a downlink transmitting beam of the base station by using a same receiving beam as that used in previous measurement.

It can be seen from FIG. 6 that, STUs corresponding to one TU use a same receiving beam. Therefore, the terminal only needs a TU identifier to determine a receiving beam.

Example 12: In FIG. 7, the base station first uses a wide beam for sending and the terminal uses a narrow beam for receiving in a polling mode. Then, the terminal determines one or more narrow beams, and when the narrow beam remains unchanged, allows the base station to perform polling by using the narrow beam. The base station configures the first indication information, where the first indication information includes the type of the first resource and/or a length of the TU. The type of the first resource in an example of FIG. 7 includes both the TU 1 and the TU 2.

(1) If a length of the TU 1 is 1 and a length of the TU 2 is 1, a receiving beam of the terminal does not need to be indicated.

(2) If a length of the TU 1 is 1, a length of the TU 2 is N, and N is greater than 1, this case is similar to Example 10, and the foregoing indication manner may be used.

Optionally, the first indication information may further include indication information indicating a quantity of STUs included in each TU.

The base station configures the second indication information, and the second indication information includes the RSRP sequence number. A reporting mode in which the terminal performs reporting at one time after measurement of all TUs is completed is used as an example. The base station indicates one or more sequence numbers to the terminal based on a reporting sequence of the terminal by using a previous RSRP reporting result of the terminal. The terminal may determine its own receiving beam with reference to previous reported content of the terminal. For example, the terminal previously reports an RSRP0, an RSRP1, an RSRP2, and an RSRP3, and identifies the RSRPs by using 2 bits. For example, 00 is used to identify the RSRP0, 01 is used to identify the RSRP1, 10 is used to identify the RSRP2, and 11 is used to identify the RSRP3.

When the second indication information of the base station indicates 11, 11 is corresponding to a receiving beam with the RSRP3. Therefore, the terminal can determine its own receiving beam based on the RSRP sequence number.

Optionally, the second indication information may further include QCL information. For example, the information may be carried by default by defining a field occupied by the indication information as a QCL indication field. In this case, it indicates that a used sending resource and a sending resource corresponding to the RSRP sequence number are QCL in terms of a parameter. For example, the parameter is an AOA on the terminal side. This indicates that AOAs at which two sending resources arrive at the terminal side are the same. In other words, the terminal may receive a downlink transmitting beam of the base station by using a same receiving beam as that used in previous measurement.

Example 13: In FIG. 7, the base station first uses a wide beam for sending and the terminal uses a narrow beam for receiving in a polling mode. Then, the terminal determines one or more narrow beams, and when the narrow beam remains unchanged, allows the base station to perform polling by using the narrow beam. The base station configures the first indication information, where the first indication information includes the type of the first resource and/or a length of the TU. The type of the first resource in an example of FIG. 7 includes both the TU 1 and the TU 2.

(1) If a length of the TU 1 is 1 and a length of the TU 2 is 1, a receiving beam of the terminal does not need to be indicated.

(2) If a length of the TU 1 is 1, a length of the TU 2 is N, and N is greater than 1, this case is similar to the previous example, and the foregoing indication manner may be used.

Optionally, the first indication information may further include indication information indicating a quantity of STUs included in each TU.

The base station configures the second indication information for the terminal, where the second indication information includes the STU identifier, and the STU identifier is location information of an STU in one TU. For example, there are a total of four STUs in one TU in FIG. 5, and a corresponding STU may be identified by using 2 bits, where the first STU is 00, the second STU is 01, the third STU is 10, and the fourth STU is 11. Because each TU corresponds to different STUs in FIG. 7, a specific TU to which an STU belongs cannot be determined based on only an STU identifier. In a possible implementation, it may be agreed on that one or more beams with a largest RSRP are used in an STU in all TUs. Therefore, only an identifier of an STU with the largest RSRP needs to be indicated, and the terminal can determine to use which one or more receiving beams.

Optionally, the second indication information further includes QCL indication information. For example, the information may be carried by default by defining a field occupied by the indication information as a QCL indication field. In this case, it indicates that a used sending resource and a sending resource used for an STU identifier in a sweeping resource configured in the first indication information are QCL in terms of a parameter. For example, the parameter is an AOA on the terminal side. This indicates that AOAs at which two sending resources arrive at the terminal side are the same. In other words, the terminal may receive a downlink transmitting beam of the base station by using a receiving beam used in previous measurement.

Figure 8A:
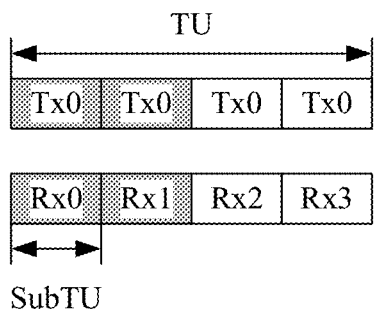
FIG. 8A is a schematic diagram of another type of configuration information according to an embodiment of the present invention.

Example 14: As shown in FIG. 8A, the base station configures the first indication information, where the first indication information includes the type of the first resource and/or a length of the TU, the type of the first resource in an example in FIG. 8A is the TU 1, the length of the TU is N, and N is equal to 1. Optionally, the first indication information may further include indication information indicating a quantity of STUs included in each TU.

The base station configures the second indication information, where the second indication information includes the STU identifier, and the STU identifier is location information of an STU in all STUs in one TU. For example, if one TU in FIG. 5 has a total of four STUs, a corresponding STU may be identified by using 2 bits, where the first STU is 00, the second STU is 01, the third STU is 10, and the fourth STU is 11. Because each TU corresponds to different STUs in FIG. 8A, a specific TU to which an STU belongs cannot be determined based on only an STU identifier. In a possible implementation, it may be agreed on that one or more beams with a largest RSRP are used in a corresponding STU in all TUs. Therefore, only an STU identifier needs to be indicated, and the terminal can know which one or more receiving resources should be used.

Further, the second indication information may further include QCL indication information. For example, the information may be carried by default by defining a field occupied by the indication information as a QCL indication field. In this case, it indicates that a sending resource used by the base station and a sending resource used for an STU identifier in a sweeping resource indicated in the first indication information are QCL in terms of a parameter. For example, the parameter is an AOA on the terminal side. This indicates that AOAs at which two sending resources arrive at the terminal side are the same. Alternatively, it may be understood that the terminal may receive a downlink sending resource of the base station by using a same receiving resource as that used in previous measurement. Similarly, other QCL parameters are not described.

Figure 8B:
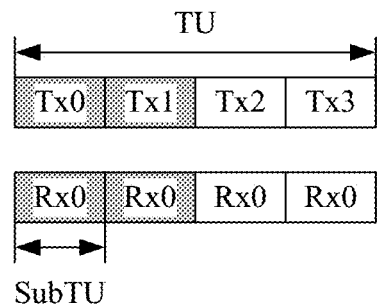
FIG. 8B is a schematic diagram of another type of configuration information according to an embodiment of the present invention.

Example 15: As shown in FIG. 8B, the base station configures the first indication information, where the first indication information includes the type of the first resource and/or a length of the TU, the type of the first resource in an example in FIG. 8B is the TU 2, the length of the TU is N, and N is equal to 1. Optionally, the first indication information may further include indication information indicating a quantity of STUs included in each TU.

In this example, because a receiving beam does not change, no indication is required, and no second indication information needs to be sent.

Uplink Solution: Embodiment 2

Figure 9:
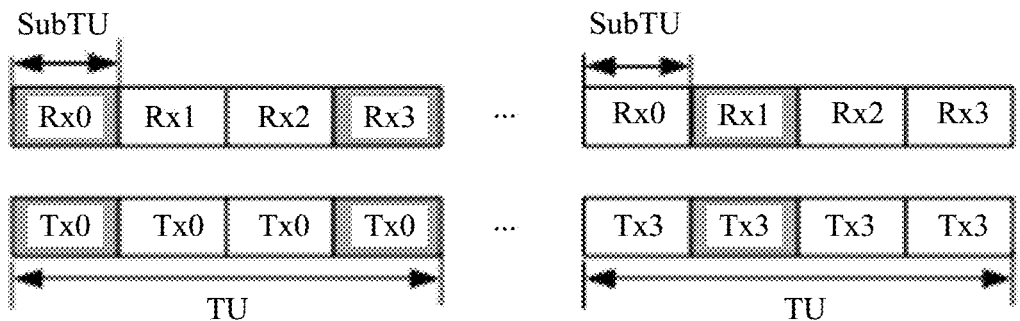
FIG. 9 is a schematic diagram of another type of configuration information according to an embodiment of the present invention.

Example 1: As shown in FIG. 9, Tx represents a sending resource of the terminal and Rx represents a receiving resource of the base station. Sending resources are the same across different STUs in each TU, and receiving resources are different across different STUs in each TU. FIG. 9 corresponds to the TU 1 and a length of the TU 1 is greater than 1. The base station may determine signal strength of a receiving beam corresponding to each STU, and the base station needs to indicate a transmitting beam to be used by the terminal.

The base station generates the first indication information, where the first indication information is indication information that the type of the first resource is the TU 1, and the length of the TU is greater than 1.

Optionally, the base station may further indicate that each TU includes four STUs.

The base station generates the second indication information, where the second indication information includes the TU identifier, and the TU identifier is location information of a TU relative to a length of all TUs configured in the first indication information. For example, it is assumed that there are a total of four TUs in FIG. 9, and the four TUs may be identified by using 2 bits. For example, the first TU is 00, the second TU is 01, the third TU is 10, and the fourth TU is 11.

Optionally, the second indication information may further include QCL indication information. For example, the information may be carried by default by defining a field occupied by the indication information as a QCL indication field. In this case, it indicates that a sending resource used by the terminal and a sending resource used for a TU identifier in a sweeping resource configured in the first indication information are QCL in terms of a parameter. For example, the parameter is an AOD on the terminal side. This indicates that AODs of two sending resources arriving at the terminal are the same. In other words, the terminal may use a same uplink transmitting beam as that used in previous measurement. Similarly, other parameters are not described.

It can be seen from FIG. 9 that, STUs corresponding to one TU use a same transmitting beam. Therefore, the terminal only needs a TU identifier to determine a sending resource.

Further, if there are a plurality of antenna panels on the terminal side, that is, the terminal supports a plurality of receiving beams at the same time, the second indication information may further include CSI-RS resource indicator information used for distinguishing between a plurality of receiving beams in a same STU.

Further, if the terminal has a plurality of pieces of CSI-RS measurement setting information, the terminal further needs to determine a result for a specific piece of measurement setting information. In this case, the second indication information may further include CSI-RS measurement setting information used for distinguishing between different CSI-RS measurement settings.

Similarly, the second indication information may further include a sounding reference signal resource indicator SRS resource indicator used for distinguishing between different SRS resources.

Similarly, the second indication information may further include a sounding reference signal SRS measurement setting used for distinguishing between different SRS measurement settings.

Figure 10A:
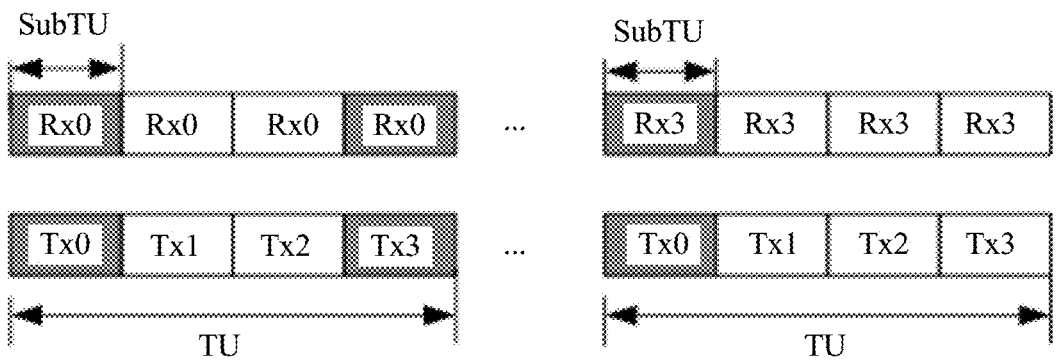
FIG. 10A is a schematic diagram of another type of configuration information according to an embodiment of the present invention.

Example 2: As shown in FIG. 10A, in this case, a transmitting beam and a receiving beam in each TU do not change, the type of the first resource is correspondingly the TU 2, and the length of the TU is greater than 1. In this case, the base station may know received signal strength corresponding to each STU, and the base station needs to indicate a transmitting beam to be used by the terminal.

The base station sends the first indication information to the terminal, where the first indication information includes the following: The type of the first resource is the TU 2, and the length of the TU is greater than 1. In this case, the base station further needs to indicate that each TU includes four STUs.

The base station sends the second indication information to the terminal, where the second indication information includes the STU identifier, and the STU identifier is location information of an STU in all STUs in one TU. For example, there are a total of four STUs in one TU in FIG. 10A, and a corresponding STU may be identified by using 2 bits, where the first STU is 00, the second STU is 01, the third STU is 10, and the fourth STU is 11. The base station traverses corresponding STUs in each TU. Therefore, a corresponding transmitting beam can be determined based on only the STU identifier.

Further, the second indication information may further include or not include QCL indication information. If the second indication information includes the QCL information, for example, the information may be carried by default by defining a field occupied by the indication information as a QCL indication field, in this case, it indicates that a sending resource used by the terminal and a sending resource used for an STU identifier in a sweeping resource configured in the first indication information are QCL in terms of a parameter. For example, the parameter is an AOD on the terminal side. This indicates that AODs of two sending resources are the same on the terminal side. In other words, the terminal may use a same transmitting beam as that used in previous measurement.

Further, if there are a plurality of antenna panels on the terminal side, that is, the terminal supports a plurality of receiving beams at the same time, the second indication information may further include CSI-RS resource indicator information used for distinguishing between a plurality of receiving beams in a same STU.

Further, if the terminal has a plurality of pieces of CSI-RS measurement setting information, the terminal further needs to determine a result for a specific piece of measurement setting information. In this case, the second indication information may further include CSI-RS measurement setting information used for distinguishing between different CSI-RS measurement settings.

Similarly, the second indication information may further include a sounding reference signal resource indicator SRS resource indicator used for distinguishing between different SRS resources.

Similarly, the second indication information may further include a sounding reference signal SRS measurement setting used for distinguishing between different SRS measurement settings.

Figure 10B:
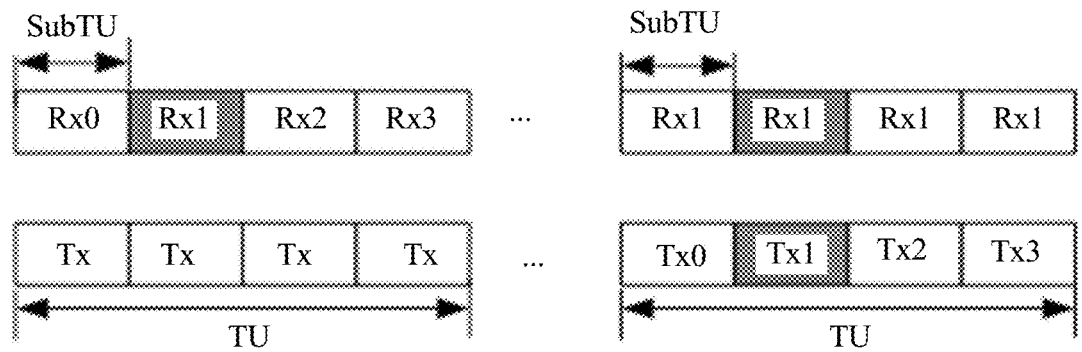
FIG. 10B is a schematic diagram of another type of configuration information according to an embodiment of the present invention.

Example 3: As shown in FIG. 10B, in this case, sweeping is performed by using a wide beam as a transmitting beam and a narrow beam as a receiving beam. A determined receiving beam remains unchanged in one TU, and sweeping is performed on a transmitting beam in one TU. In this way, a receiving and transmitting beam pair is determined.

In this case, the type of the TU is the TU 1 and the TU 2, where a quantity of the TUs 1 is 1, and a quantity of TUs 2 is 1 or greater than 1. If the quantity of the TUs 2 is equal to 1, an identifier of an STU in the TU 2 needs to be indicated. If the quantity of TUs 2 is greater than 1, an identifier of an STU in the TU 2 also needs to be indicated.

The base station sends the first indication information to the terminal, where the first indication information is used to indicate the two types of the first resource: the TU 1 and the TU 2, and indicate the length of the TU, where the TU 1 is equal to 1, and the TU 2 is greater than or equal to 1.

Optionally, the first indication information may further include information indicating a quantity of STUs included in each TU.

The base station sends the second indication information to the terminal, where the second indication information includes the STU identifier.

Further, if there are a plurality of antenna panels on the terminal side, that is, the terminal supports a plurality of receiving beams at the same time, the second indication information may further include CSI-RS resource indicator information used for distinguishing between a plurality of receiving beams in a same STU.

Further, if the terminal has a plurality of pieces of CSI-RS measurement setting information, the terminal further needs to determine a result for a specific piece of measurement setting information. In this case, the second indication information may further include CSI-RS measurement setting information used for distinguishing between different CSI-RS measurement settings.

Similarly, the second indication information may further include a sounding reference signal resource indicator SRS resource indicator used for distinguishing between different SRS resources.

Similarly, the second indication information may further include a sounding reference signal SRS measurement setting used for distinguishing between different SRS measurement settings.

Figure 11A:
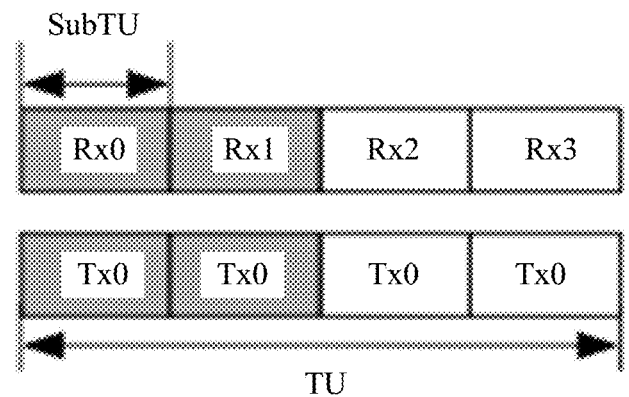
FIG. 11A is a schematic diagram of another type of configuration information according to an embodiment of the present invention.

Example 4: As shown in FIG. 11A, the type of the first resource corresponds to the TU 1 in the option 1. In this case, transmitting beams are the same and receiving beams are different across STUs in each TU. The base station configures the first indication information, where the first indication information includes the type of the first resource and/or a length of the TU, the type of the first resource in an example in FIG. 11A is the TU 1, the length of the TU is N, and N is equal to 1. Optionally, the first indication information may further include indication information indicating a quantity of STUs included in each TU.

In this example, because a transmitting beam does not change, no indication is required, and no second indication information needs to be sent.

Figure 11B:
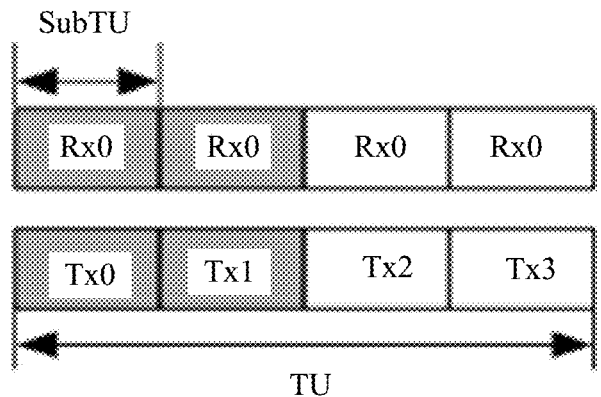
FIG. 11B is a schematic diagram of another type of configuration information according to an embodiment of the present invention.

Example 5: As shown in FIG. 11B, the type of the first resource corresponds to the TU 2 in the option 2. In this case, transmitting beams are different and receiving beams are the same across STUs in each TU, and the length of the TU is equal to 1. In this case, the base station side may know signal strength of a receiving beam corresponding to each STU, and the base station needs to indicate a sending resource to be used by the terminal.

The base station sends the first indication information to the terminal, where the first indication information includes information that the type of the first resource is the TU 2 and the length of the TU is 1. Optionally, the first indication information may further include information indicating a quantity of STUs included in each TU.

The base station sends the second indication information to the terminal, where the second indication information includes the STU identifier, and the STU identifier is location information of an STU in all STUs in one TU. For example, there are a total of four STUs in one TU in the figure, and the four STUs may be identified by using 2 bits, where the first STU is 00, the second STU is 01, the third STU is 10, and the fourth STU is 11. The base station traverses corresponding STUs in each TU. Therefore, a sending resource can be determined based on only the STU identifier.

Further, the second indication information may further include or not include QCL indication information. If the second indication information includes the QCL indication information, the information may be carried by default by defining a field occupied by the indication information as a QCL indication field. In this case, it indicates that a sending resource used by the terminal and a sending resource used for an STU identifier in a measurement resource in the first indication information are QCL in terms of a parameter. For example, the parameter is an angle of departure AOD) on the terminal side. This indicates that AODs of two sending resources are the same on the terminal side. In other words, the terminal may use a same transmitting beam as that used in previous measurement.

Further, if there are a plurality of antenna panels on the terminal side, that is, the terminal supports a plurality of receiving beams at the same time, the second indication information may further include CSI-RS resource indicator information used for distinguishing between a plurality of receiving beams in a same STU.

Further, if the terminal has a plurality of pieces of CSI-RS measurement setting information, the terminal further needs to determine a result for a specific piece of measurement setting information. In this case, the second indication information may further include CSI-RS measurement setting information used for distinguishing between different CSI-RS measurement settings.

Similarly, the second indication information may further include a sounding reference signal resource indicator SRS resource indicator used for distinguishing between different SRS resources.

Similarly, the second indication information may further include a sounding reference signal SRS measurement setting used for distinguishing between different SRS measurement settings.

Embodiment 3

In general, a base station needs to indicate an uplink sending resource of a terminal. The sending resource may be resources of different channels, such as a physical uplink control channel (PUCCH) or a physical uplink shared channel (PUSCH).

If the sending resource is a physical uplink control channel (PUCCH), the base station needs to indicate, to the terminal, a specific beam and a specific time resource that are to be used for sending. Different PUCCHs correspond to different receiving beams on a base station side, and the base station needs to send configuration information to the terminal, where the configuration information includes a relationship between receiving of a PUCCH on the base station side and a time resource. After receiving the configuration information, the terminal determines to send a corresponding PUCCH beam on a time resource indicated by the configuration information.

Figure 12:
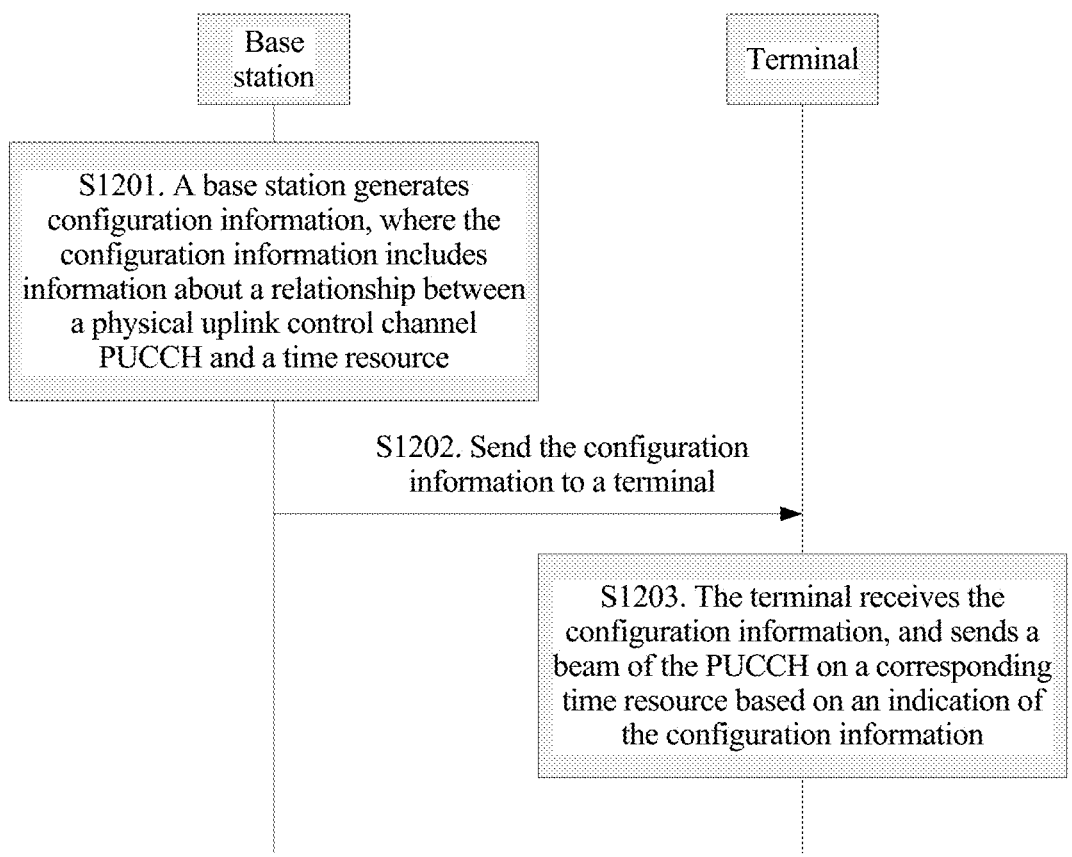
FIG. 12 is a schematic structural diagram of a base station according to an embodiment of the present invention.

Embodiment 3 of illustrative embodiments of the present invention provides a configuration method. As shown in FIG. 12, the method includes the following steps.

S1201. A base station generates configuration information, where the configuration information includes information about a relationship between a physical uplink control channel PUCCH and a time resource.

S1202. The base station sends the configuration information to a terminal, so that the terminal sends the physical uplink control channel on the corresponding time resource.

After uplink and downlink beam sweeping, information that can be obtained by the base station and the terminal is as follows:

(1) Downlink sweeping: The base station sends a downlink beam to the terminal, and the terminal receives the downlink beam by using a corresponding receiving beam. After a sweeping process is completed, the terminal reports one or more optimal transmitting beams and an RSRP corresponding to each beam to the base station, and the terminal stores a corresponding receiving beam. For example, the information that can be obtained by the base station is: {Txi, RSRPi}, {Txj, RSRPj}, . . . , and the information that can be obtained by the terminal is: {Txi, Rxi, RSRPi}, {Txj, Rxj, RSRPj}, . . . , where Txi identifies the $i^{th}$ transmitting beam and RSRPi represents an RSRP sequence number.

(2) Uplink sweeping: The terminal sends an uplink beam to the base station, and the base station receives the uplink beam by using a corresponding receiving beam. After a sweeping process is completed, the information that can be obtained by the base station is {Txi, Rxi, RSRPj} and {Txj, Rxj, RSRPj}, and the information that can be obtained by the terminal may be {Txi} and {Txj}, where Txi identifies the $i^{th}$ transmitting beam, RSRPi represents an RSRP sequence number, and Rxj represents the $j^{th}$ receiving beam.

If both the base station and the terminal are fully reciprocally calibrated, a downlink sweeping result may be directly used for an uplink, and the terminal has information about a receiving and transmitting beam pair, and may directly obtain a sending time with reference to configuration information of a receiving beam of the PUCCH.

If the base station and the terminal are partially reciprocally calibrated, a downlink sweeping result may be partially used for an uplink. One receiving beam of the terminal is corresponding to a plurality of transmitting beams, and one transmitting beam of the base station is corresponding to a plurality of receiving beams. In this case, the terminal may perform sending by using the corresponding plurality of transmitting beams, and may perform sending at a plurality of time points with reference to configuration information of a receiving beam of the PUCCH.

If the base station and the terminal are non-reciprocal, the terminal can only use an uplink sweeping result. In this case, the base station may send beam pairing information to the terminal, and the terminal performs automatic pairing based on the configuration information of the PUCCH and the pairing information. For example, the pairing information is as follows:

For a terminal 0, (Tx1, Rx3) and (Tx3, Rx2) indicate pairing information of two pairs of beams, where (Tx1, Rx3) indicates that the terminal uses a transmitting beam 1 and the base station uses a receiving beam 3; and (Tx3, Rx2) indicates that the terminal uses a transmitting beam 3 and the base station uses a receiving beam 2.

For a terminal 1, (Tx5, Rx2) and (Tx4, Rx2) indicate pairing information of two pairs of beams, where (Tx5, Rx2) indicates that the terminal uses a transmitting beam 5 and the base station uses a receiving beam 2; and (Tx4, Rx2) indicates that the terminal uses a transmitting beam 4 and the base station uses a receiving beam 2.

For a terminal 2, (Tx4, Rx3) and (Tx1, Rx3) indicate pairing information of two pairs of beams, where (Tx4, Rx3) indicates that the terminal uses a transmitting beam 4 and the base station uses a receiving beam 3; and (Tx1, Rx3) indicates that the terminal uses a transmitting beam 1 and the base station uses a receiving beam 3.

For a terminal 3, (Tx2, Rx4) and (Tx2, Rx5) indicate pairing information of two pairs of beams, where (Tx2, Rx4) indicates that the terminal uses a transmitting beam 2 and the base station uses a receiving beam 4; and (Tx2, Rx5) indicates that the terminal uses a transmitting beam 2 and the base station uses a receiving beam 5.

For a terminal 4, (Tx3, Rx5) and (Tx5, Rx2) indicate pairing information of two pairs of beams, where (Tx3, Rx5) indicates that the terminal uses a transmitting beam 3 and the base station uses a receiving beam 5; and (Tx5, Rx2) indicates that the terminal uses a transmitting beam 5 and the base station uses a receiving beam 2.

In this case, the terminal determines, based on the pairing information of the PUCCH, a time for performing sending.

For the base station, when the base station uses the receiving beam Rx2 at a specific time, it indicates that the terminal 1 performs sending; when the base station uses the receiving beam Rx3 at a specific time, it indicates that the terminal 0 and the terminal 2 perform sending; when the base station uses the receiving beam Rx4 at a specific time, it indicates that the terminal 3 performs sending; and when the base station uses the receiving beam Rx5 at a specific time, it indicates that the terminal 4 performs sending.

If a multi-beam sending mode is configured for a terminal, for example, if a sending mode configured for the terminal 1 requires two transmitting beams, the terminal 1 performs sending at two corresponding time points. The two time points respectively correspond to the beams Rx3 and Rx2 for receiving the PUCCH by the base station.

If an uplink transmitting beam of the terminal is a PUSCH, control information may be sent on the PUSCH. In this case, a transmitting beam of the terminal needs to be indicated based on a type of the control information.

Embodiment 4 of illustrative embodiments of the present invention provides a configuration method, including the following steps.

Step 1: A base station generates first configuration information and second configuration information, where the first configuration information is transmitted on each beam in a first beam set, the second configuration is transmitted on each beam in a second beam set, and the first beam set includes the second beam set.

Step 2: The base station sends the first configuration information and the second configuration information to a terminal.

Further, the first configuration information may include one or more of the following: hybrid automatic repeat request acknowledgment (HARQ-ACK) information, beam recover request (RR) information, a rank indicator (RI), a CSI-RS resource indicator, an SRS resource indicator, beam-related information (including a beam index, a beam identifier, and/or an RSRP), a channel quality indicator (CQI), a precoding matrix indicator (PMI), and the like.

The second configuration information is a subset of the first configuration information.

Further, because the first configuration information and the second configuration information are control information, during multiplexing with data, the first configuration information may be multiplexed at each layer of all transport blocks in the first beam set, and the second configuration information may be multiplexed at each layer of all or some transport blocks in the second beam set.

For example, a transport block that is multiplexed with a second type of control information is a transport block that has a highest modulation coding scheme in the first beam set.

Optionally, different control information in the first configuration information is mapped onto a PUSCH in different manners. A possible implementation is as follows:

A HARQ-ACK or an RR is placed at a location nearest to a demodulation pilot of the PUSCH by using time division or frequency division.

An RI/a CRI or (a BI/an RSRP) is placed at a location second nearest to the demodulation pilot of the PUSCH by using time division or frequency division.

An RSRP/a CQI/a PMI is placed at a location third nearest to the demodulation pilot of the PUSCH by using time division or frequency division.

Figure 13:
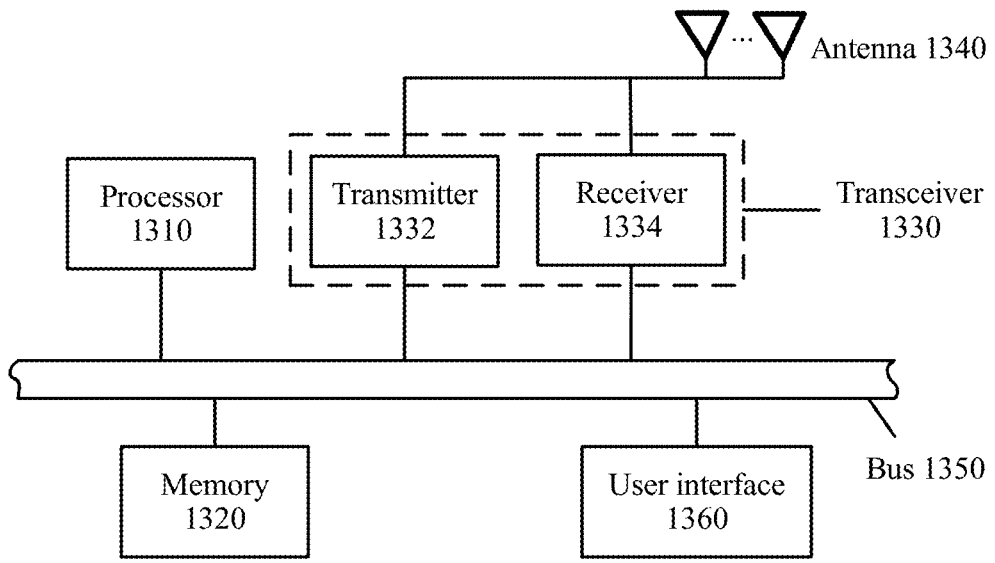
FIG. 13 is a schematic structural diagram of a base station according to an embodiment of the present invention.

FIG. 13 is a schematic block diagram of a base station according to still another embodiment of the present invention. A base station 1300 includes a processor 1310, a memory 1320, a transceiver 1330, an antenna 1340, a bus 1350, and a user interface 1360.

Specifically, the processor 1310 controls an operation of the transmitter 1300. The processor may be a general-purpose processor, a digital signal processor, an application-specific integrated circuit, a field programmable gate array, or another programmable logic device.

The transceiver 1330 includes a transmitter 1332 and a receiver 1334, the transmitter 1332 is configured to transmit a signal, and the receiver 1334 is configured to receive a signal. There may be one or more antennas 1340. The base station 1300 may further include the user interface 1360, such as a keyboard, a microphone, a speaker, and/or a touchscreen. The user interface 1360 may deliver content and a control operation to the base station 1300.

Components of the base station 1300 are coupled together by using the bus 1350. In addition to a data bus, the bus system 1350 includes a power bus, a control bus, and a status signal bus. However, for clear description, various types of buses in the figure are marked as the bus system 1350. It should be noted that the foregoing descriptions about a network element structure may be applied to the embodiments of the present invention.

The memory 1320 may include a read-only memory (ROM), a random access memory (RAM), or a dynamic storage device of another type that can store information and an instruction, or may be a disk memory. The memory 1320 may be configured to store an instruction for implementing the related methods provided in the embodiments of the present invention. It can be understood that, an executable instruction is programmed or loaded to at least one of the processor 1310, a cache, and a long-term memory in the base station 1300.

In a specific embodiment, the processor 1310 is configured to: generate first indication information, where the first indication information is used to indicate configuration information of a first resource; generate, by the base station, second indication information, where the second indication information is used to indicate a relationship between a second resource and the first resource; and the transceiver 1330 is configured to send the first indication information and the second indication information to a terminal, so that the terminal determines its own receiving resource or sending resource based on the first indication information and the second indication information.

The first indication information includes a type of the first resource and/or a length of the first resource.

Specifically, the type of the first resource is used to indicate a relationship between a sending resource and a time unit.

Specifically, the length of the first resource includes a quantity of time units.

Specifically, the second indication information includes one or more types of the following information:

a time unit identifier, a sub-time unit identifier, a reference signal received power RSRP, a channel state information reference signal resource indicator CSI-RS resource indicator, a sounding reference signal resource indicator SRS resource indicator, a channel state information CSI measurement setting, and a sounding reference signal SRS measurement setting.

Optionally, the second indication information further includes quasi co-location QCL indication information.

Specifically, the QCL indication information includes one or more types of the following information:

a delay spread, a Doppler spread, a Doppler shift, an average gain, an average delay, an angle of arrival AOA, an angle of departure AOD, an average AOA, an average AOD, a transmitting beam, a receiving beam, spatial relation, a channel state information reference signal resource indicator CSI-RS resource indicator, a sounding reference signal resource indicator SRS resource indicator.

Optionally, the first indication information and the second indication information are sent to the terminal device by being encapsulated in any one of the following messages: a physical downlink control channel PDCCH message, or a radio resource control RRC message, or a media access control control element MAC CE.

In another specific embodiment, the processor 1310 is configured to generate configuration information, where the configuration information includes information about a relationship between a physical uplink control channel PUCCH and a time resource.

The transceiver 1330 sends the configuration information to a terminal, so that the terminal sends the physical uplink control channel on the corresponding time resource.

In another specific embodiment, the processor 1310 is configured to generate, by the base station, first configuration information and second configuration information, where the first configuration information is transmitted on each beam in a first beam set, the second configuration is transmitted on each beam in a second beam set, and the first beam set includes the second beam set.

The transceiver 1330 sends the first configuration information and the second configuration information to the terminal.

It should be further understood that, the base station shown in FIG. 13 corresponds to the base station in the foregoing method Embodiments 1 to 4. Descriptions of all details of the method Embodiments 1 to 4 may all be used to explain the apparatus embodiment of the base station. For details about interaction between the base station and the terminal, refer to the foregoing description. Details are not described again.

Figure 14:
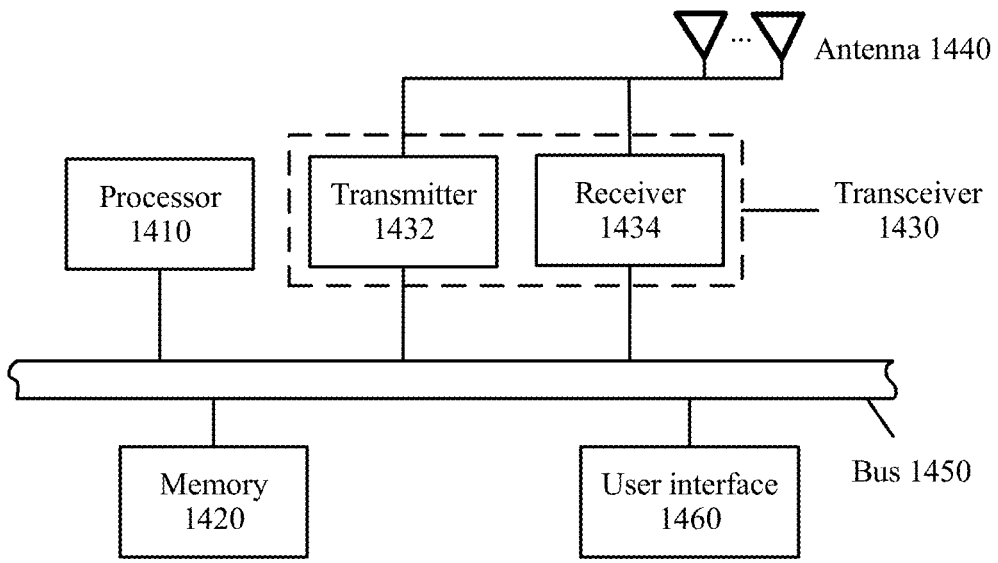
FIG. 14 is a schematic structural diagram of a terminal according to an embodiment of the present invention.

FIG. 14 is a schematic block diagram of a terminal according to still another embodiment of the present invention. A terminal 1400 includes a processor 1410, a memory 1420, a transceiver 1430, an antenna 1440, a bus 1450, and a user interface 1460.

Specifically, the processor 1410 controls an operation of the terminal 1400. The processor may be a general-purpose processor, a digital signal processor, an application-specific integrated circuit, a field programmable gate array, or another programmable logic device.

The transceiver 1430 includes a transmitter 1432 and a receiver 1434, the transmitter 1432 is configured to transmit a signal, and the receiver 1434 is configured to receive a signal. There may be one or more antennas 1440. The terminal 1400 may further include the user interface 1460, such as a keyboard, a microphone, a speaker, and/or a touchscreen. The user interface 1460 may deliver content and a control operation to the terminal 1400.

Components of the terminal 1400 are coupled together by using the bus 1450. In addition to a data bus, the bus system 1450 includes a power bus, a control bus, and a status signal bus. However, for clear description, various types of buses in the figure are marked as the bus system 1450. It should be noted that the foregoing descriptions about a network element structure may be applied to the embodiments of the present invention.

The memory 1420 may include a read-only memory (ROM), a random access memory (RAM), or a dynamic storage device of another type that can store information and an instruction, or may be a disk memory. The memory 1420 may be configured to store an instruction for implementing the related methods provided in the embodiments of the present invention. It can be understood that, an executable instruction is programmed or loaded to at least one of the processor 1410, a cache, and a long-term memory in the terminal 1400. In a specific embodiment, the memory is configured to store computer executable program code. When the program code includes an instruction and when the processor executes the instruction, the instruction enables the terminal 1400 to perform the following operations.

The transceiver 1430 is configured to receive first indication information and second indication information from a base station, where the first indication information is used to indicate configuration information of a first resource; and the second indication information is used to indicate a relationship between a second resource and the first resource.

The processor 1410 is configured to determine the second resource based on the first indication information and the second indication information.

Specifically, the first indication information includes a type of the first resource and/or a length of the first resource.

The length of the first resource includes a quantity of time units.

The second indication information includes one or more types of the following information:

a time unit identifier, a sub-time unit identifier, a reference signal received power RSRP, a channel state information reference signal resource indicator CSI-RS resource indicator, a sounding reference signal resource indicator SRS resource indicator, a channel state information CSI measurement setting, and a sounding reference signal SRS measurement setting.

Optionally, the second indication information further includes QCL indication information.

Specifically, the QCL indication information is one or more types of the following information: a delay spread, a Doppler spread, a Doppler shift, an average gain, an average delay, an angle of arrival (AOA), an angle of departure (AOD), an average angle of arrival (AOA), an average angle of departure (AOD), a transmitting beam, a receiving beam, spatial relation, a channel state information reference signal resource indicator (CSI-RS resource indicator), and a sounding reference signal resource indicator (SRS resource indicator).

Specifically, the receiving resource and/or the sending resource include/includes a receiving beam, or a transmitting beam, or a receive port, or a transmit port, or a space resource.

For specific implementations of the operations performed by the processor included in the terminal, refer to corresponding steps performed by the terminal in the method embodiments. Details are not described in this embodiment of the present invention again.

It should be understood that, the terminal shown in FIG. 14 corresponds to the terminal in the foregoing method Embodiments 1 to 4. Descriptions of all details of the method Embodiments 1 to 4 may all be used to explain the apparatus embodiment of the terminal. For details about interaction between the base station and the terminal, refer to the foregoing description. Details are not described again.

An embodiment of the present invention further provides a computer storage medium, configured to store a computer software instruction used by the base station. The computer storage medium contains a program designed for executing the foregoing aspects.

An embodiment of the present invention further provides a computer storage medium, configured to store a computer software instruction used by the foregoing terminal device. The computer storage medium contains a program designed for executing the foregoing aspects.

An embodiment of the present invention further provides a communications network system, including a base station and a terminal. The base station is configured to perform the steps performed by the base station in the method embodiments; and the terminal is configured to perform the steps performed by the terminal in the method embodiments. For an interaction process between the base station and the terminal, refer to the description of the method embodiments. Details are not described herein again. The communication method provided in the embodiments of the present invention can reduce resource indication overheads.

In the specification, claims, and accompanying drawings of the illustrative examples of the present invention, the terms "first", "second", "third", "fourth", and so on are intended to distinguish between different objects but do not indicate a particular order. In addition, the terms "comprising", "including", or any other variant thereof, are intended to cover non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the system, the product, or the device.

All or some of the foregoing embodiments may be implemented by software, hardware, firmware, or any combination thereof. When software is used to implement the embodiments, the embodiments may be implemented completely or partially in a form of a computer program product. The computer program product includes one or more computer instructions. When the computer program instruction is loaded and executed on the computer, the procedure or functions according to the embodiments of the present invention are all or partially generated. The computer may be a general-purpose computer, a dedicated computer, a computer network, or other programmable apparatuses. The computer instruction may be stored in a computer-readable storage medium or may be transmitted from a computer-readable storage medium to another computer-readable storage medium. For example, the computer instruction may be transmitted from a website, computer, server, or data center to another website, computer, server, or data center in a wired (e.g., a coaxial cable, an optical fiber, or a digital subscriber line (DSL)) or wireless (e.g., infrared, radio, and microwave, or the like) manner. The computer-readable storage medium may be any usable medium accessible by a computer, or a data storage device, such as a server or a data center, integrating one or more usable media. The usable medium may be a magnetic medium (e.g., a floppy disk, a hard disk, or a magnetic tape), an optical medium (e.g., DVD), a semiconductor medium (e.g., a Solid State Disk (SSD)), or the like.

What is disclosed above is merely example embodiments of the present invention, and certainly is not intended to limit the protection scope of the present invention. Therefore, equivalent variations made in accordance with the claims of the present invention shall fall within the scope of the present invention.

What is claimed is:

1. A communication method, carried out by a base station, the method comprising:

generating a first indication information, wherein the first indication information indicates a configuration information of a first resource;

generating a second indication information, wherein the second indication information indicates a relationship between a second resource and the first resource; and sending the first indication information and the second indication information to a terminal,
wherein the first indication information and the second indication information are used by the terminal to determine a receiving resource and/or a sending resource,
wherein the first indication information comprises:
   a type of the first resource, and
   a length of the first resource;
wherein the type of the first resource indicates:
   a relationship between a sending resource of the base station and a time unit including an Orthogonal Frequency Division Multiplexing (OFDM) symbol, or
   a relationship between the sending resource of the terminal and a time unit including an OFDM symbol,
wherein the length of the first resource is a quantity of time units, and
wherein the second indication information comprises at least one type of information taken from the group consisting of:
   a time unit identifier,
   a sub-time unit identifier, and
   a reference signal received power (RSRP) sequence number.

2. The method according to claim 1, wherein the second indication information further comprises one or more types of information taken from the group consisting of:
   a channel state information reference signal resource indicator (CSI-RS resource indicator),
   a sounding reference signal resource indicator (SRS resource indicator), a channel state information (CSI) measurement setting, and
   a sounding reference signal (SRS) measurement setting.

3. The method according to claim 1, wherein the second indication information further comprises a quasi co-location (QCL) indication information.

4. A communication method carried out by a terminal, the method comprising:
   receiving a first indication information and a second indication information from a base station, wherein the first indication information indicates a configuration information of a first resource, and wherein the second indication information indicates a relationship between a second resource and the first resource; and
   determining, based on the first indication information and the second indication information, a receiving resource or a sending resource,
   wherein the first indication information comprises:
      a type of the first resource, and
      a length of the first resource;
   wherein the type of the first resource indicates:
      a relationship between a sending resource of the base station and a time unit including an Orthogonal Frequency Division Multiplexing (OFDM) symbol, or
      a relationship between the sending resource of the terminal and a time unit including an OFDM symbol,
   wherein the length of the first resource is a quantity of time units, and
   wherein the second indication information comprises at least one type of information taken from the group consisting of:
      a time unit identifier,
      a sub-time unit identifier, and
      a reference signal received power (RSRP) sequence number.

5. The method according to claim 4, wherein the second indication information further comprises one or more types of information taken from the group consisting of:
   a channel state information reference signal resource indicator (CSI-RS resource indicator),
   a sounding reference signal resource indicator (SRS resource indicator),
   a channel state information (CSI) measurement setting, and
   a sounding reference signal (SRS) measurement setting.

6. The method according to claim 4, wherein the second indication information further comprises a quasi co-location (QCL) indication information.

7. A base station, comprising:
   a transceiver;
   a processor; and
   a non-transitory computer-readable medium including computer-executable instructions that, when executed by the processor, facilitate carrying out a method comprising:
      generating, by the processor, a first indication information, wherein the first indication information indicates a configuration information of a first resource; and
      generating, by the processor, a second indication information, wherein the second indication information indicates a relationship between a second resource and the first resource; and
      sending, by the transceiver cooperatively operating with the processor, the first indication information and the second indication information to a terminal,
   wherein the first indication information and the second indication information are used by the terminal to determine a receiving resource and/or a sending resource,
   wherein the first indication information comprises:
      a type of the first resource, and
      a length of the first resource;
   wherein the type of the first resource indicates:
      a relationship between a sending resource of the base station and a time unit including an Orthogonal Frequency Division Multiplexing (OFDM) symbol, or
      a relationship between the sending resource of the terminal and a time unit including an OFDM symbol,
   wherein the length of the first resource is a quantity of time units, and
   wherein the second indication information comprises at least one type of information taken from the group consisting of:
      a time unit identifier,
      a sub-time unit identifier, and
      a reference signal received power (RSRP) sequence number.

8. The base station according to claim 7, wherein the second indication information further comprises one or more types of information taken from the group consisting of:
   a channel state information reference signal resource indicator (CSI-RS resource indicator),
   a sounding reference signal resource indicator (SRS resource indicator),
   a channel state information (CSI) measurement setting, and
   a sounding reference signal (SRS) measurement setting.

9. The base station according to claim 7, wherein the second indication information further comprises a quasi co-location (QCL) indication information.

10. A terminal, comprising:
a transceiver,
a processor, and
a non-transitory computer-readable medium including computer-executable instructions that, when executed by the processor, facilitate the terminal carrying out a method comprising:
receiving, by the transceiver cooperatively operating with the processor, a first indication information and a second indication information from a base station, wherein the first indication information indicates a configuration information of a first resource; and wherein the second indication information indicates a relationship between a second resource and the first resource; and
determining, by the processor based on the first indication information and the second indication information, a receiving resource or a sending resource,
wherein the first indication information comprises:
   a type of the first resource, and
   a length of the first resource;
wherein the type of the first resource indicates:
   a relationship between a sending resource of the base station and a time unit including an Orthogonal Frequency Division Multiplexing (OFDM) symbol, or
   a relationship between the sending resource of the terminal and a time unit including an OFDM symbol,
wherein the length of the first resource is a quantity of time units, and
wherein the second indication information comprises at least one type of information taken from the group consisting of:
   a time unit identifier,
   a sub-time unit identifier, and
   a reference signal received power (RSRP) sequence number.

11. The terminal according to claim 10, wherein the second indication information further comprises one or more types of information taken from the group consisting of:
   a channel state information reference signal resource indicator (CSI-RS resource indicator),
   a sounding reference signal resource indicator (SRS resource indicator), a channel state information (CSI) measurement setting, and
   a sounding reference signal (SRS) measurement setting.

12. The terminal according to claim 10, wherein the second indication information further comprises a quasi co-location (QCL) indication information.

* * * * *

UNITED STATES PATENT AND TRADEMARK OFFICE
CERTIFICATE OF CORRECTION

PATENT NO. : 10,925,034 B2
APPLICATION NO. : 16/503282
DATED : February 16, 2021
INVENTOR(S) : Li et al.

It is certified that error appears in the above-identified patent and that said Letters Patent is hereby corrected as shown below:

In the Claims

Claim 7, Column 32, Line 14: "Abase" should read -- A base --.

Signed and Sealed this
Twelfth Day of July, 2022

Katherine Kelly Vidal
*Director of the United States Patent and Trademark Office*